United States Patent [19]

Nosaki et al.

[11] Patent Number: 5,177,626
[45] Date of Patent: Jan. 5, 1993

[54] IMAGE READING APPARATUS FOR READING A DOCUMENT AT A SPEED CORRESPONDING TO THE DOCUMENT READING DENSITY

[75] Inventors: Takefumi Nosaki, Yokohama; Kazuo Sasama, Kawasaki, both of Japan

[73] Assignee: Kabushiki Kaisha Toshiba, Kawasaki, Japan

[21] Appl. No.: 442,856

[22] Filed: Nov. 29, 1989

[30] Foreign Application Priority Data

Nov. 29, 1988 [JP] Japan .................. 63-299465
Nov. 29, 1988 [JP] Japan .................. 63-299466
Dec. 27, 1988 [JP] Japan .................. 63-327603

[51] Int. Cl.⁵ .................................. H04N 1/04
[52] U.S. Cl. .......................... 358/486; 358/409; 358/410; 358/496
[58] Field of Search ............. 358/486, 496, 410, 412, 358/75, 451, 409, 497, 413; 318/696

[56] References Cited

U.S. PATENT DOCUMENTS

| | | | |
|---|---|---|---|
| 4,490,664 | 12/1984 | Moriguchi | 318/696 |
| 4,743,824 | 5/1988 | Andersson | 318/696 |
| 4,897,734 | 1/1990 | Sato et al. | 358/410 |
| 4,992,888 | 2/1991 | Nagashima | 358/410 |

*Primary Examiner*—Edward L. Coles, Sr.
*Assistant Examiner*—Thomas L. Stoll
*Attorney, Agent, or Firm*—Foley & Lardner

[57] ABSTRACT

A document reading apparatus including a document reading unit for optically reading an image of a document, a document transfer unit for transferring the reading unit at a speed corresponding to the document reading density, and a pulse motor for driving the document transfer unit. The waveform of an exciting current supplied to the pulse motor is changed in accordance with the document reading density, and the pulse motor is rotated at a speed corresponding to the waveform of the exciting current.

14 Claims, 22 Drawing Sheets

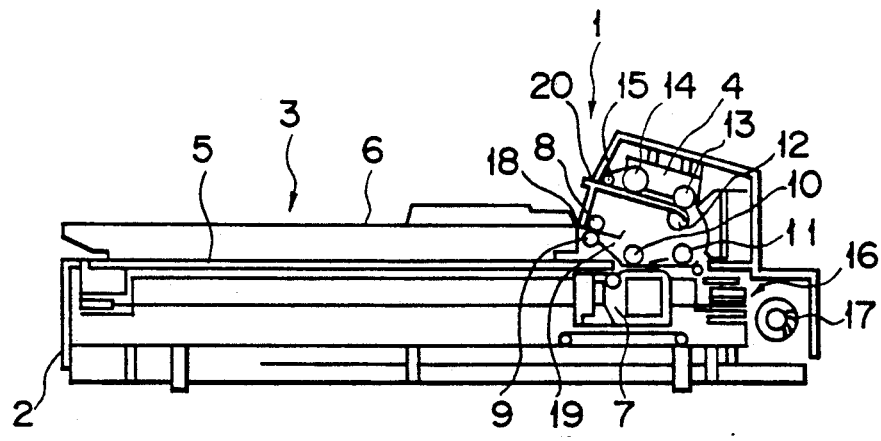
F I G. 1
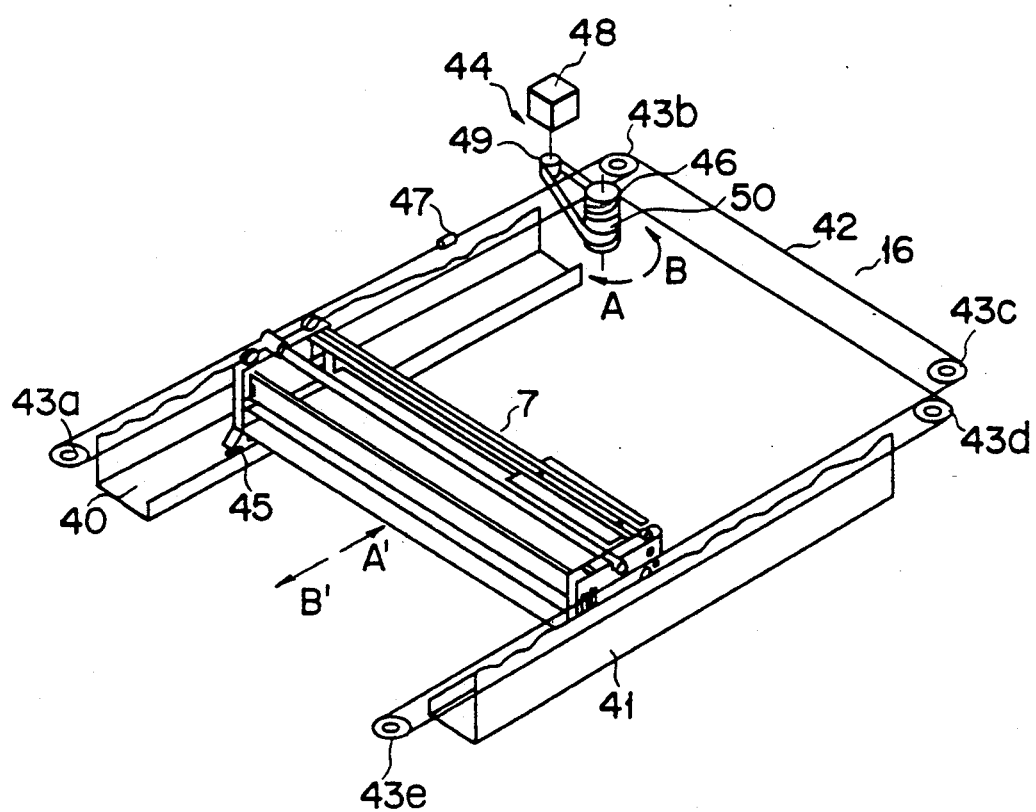
F I G. 2

A ROM DATA

| ADDRESS (LOWER) | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| (UPPER) | | | | | | | | | | | | | | | | |
| 00 | 00 | 80 | FF | 80 | 00 | 80 | FF | 80 | 00 | 80 | FF | 80 | 00 | 80 | FF | 80 |
| 01 | 00 | 80 | FF | -- | -- | | | | | | | | | | | |
| ⋮ | | | | | | | | | | | | | | | | |
| 0F | 00 | 80 | FF | 80 | 00 | 80 | FF | 80 | 00 | 80 | FF | 80 | 00 | 80 | FF | 80 |
| 10 | 00 | 40 | 80 | BF | FF | BF | 80 | 40 | 00 | 40 | 80 | BF | FF | BF | 80 | 40 |
| 11 | 00 | 40 | 80 | -- | -- | | | | | | | | | | | |
| ⋮ | | | | | | | | | | | | | | | | |
| 1F | 00 | 40 | 80 | BF | FF | BF | 80 | 40 | 00 | 40 | 80 | BF | FF | BF | 80 | 40 |
| 20 | 00 | 1F | 3F | 5F | 7F | 9F | BF | DF | FF | DF | BF | 9F | 7F | 5F | 3F | 1F |
| 21 | 00 | 1F | 3F | -- | -- | | | | | | | | | | | |
| ⋮ | | | | | | | | | | | | | | | | |
| 2F | 00 | 1F | 3F | 5F | 7F | 9F | BF | DF | FF | DF | BF | 9F | 7F | 5F | 3F | 1F |
| 30 | 00 | 10 | 20 | 30 | 40 | 50 | 60 | 70 | 80 | 8F | 9F | AF | BF | CF | DF | EF |
| 31 | FF | EF | DF | CF | BF | AF | 9F | 8F | 80 | 70 | 60 | 50 | 40 | 30 | 20 | 10 |
| | 00 | 10 | 20 | -- | -- | | | | | | | | | | | |
| ⋮ | | | | | | | | | | | | | | | | |
| 3F | FF | EF | DF | CF | BF | AF | 9F | 8F | 80 | 70 | 60 | 50 | 40 | 30 | 20 | 10 |

B ROM DATA

| ADDRESS (LOWER) | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| (UPPER) | | | | | | | | | | | | | | | | |
| 00 | FF | 80 | 00 | 80 | FF | 80 | 00 | 80 | FF | 80 | 00 | 80 | FF | 80 | 00 | 80 |
| 01 | FF | 80 | 00 | ----- | | | | | | | | | | | | |
| ⋮ | ⋮ | | | | | | | | | | | | | | | |
| 0F | FF | 80 | 00 | 80 | FF | 80 | 00 | 80 | FF | 80 | 00 | 80 | FF | 80 | 00 | 80 |
| 10 | FF | BF | 80 | 40 | 00 | 40 | 80 | BF | FF | BF | 80 | 40 | 00 | 40 | 80 | BF |
| 11 | FF | BF | 80 | ----- | | | | | | | | | | | | |
| ⋮ | ⋮ | | | | | | | | | | | | | | | |
| 1F | FF | BF | 80 | 40 | 00 | 40 | 80 | BF | FF | BF | 80 | 40 | 00 | 40 | 80 | BF |
| 20 | FF | DF | BF | 9F | 7F | 5F | 3F | 1F | 00 | 1F | 3F | 5F | 7F | 9F | BF | DF |
| 21 | FF | DF | BF | ----- | | | | | | | | | | | | |
| ⋮ | ⋮ | | | | | | | | | | | | | | | |
| 2F | FF | DF | BF | 9F | 7F | 5F | 3F | 1F | 00 | 1F | 3F | 5F | 7F | 9F | BF | DF |
| 30 | FF | EF | DA | CF | BF | AF | 9F | 8F | 80 | 70 | 60 | 50 | 40 | 30 | 20 | 10 |
| 31 | 00 | 10 | 20 | 30 | 40 | 50 | 60 | 70 | 80 | 8F | 9F | AF | BF | CF | DF | EF |
| | FF | EF | DF | ----- | | | | | | | | | | | | |
| ⋮ | ⋮ | | | | | | | | | | | | | | | |
| 3F | 00 | 10 | 20 | 30 | 40 | 50 | 60 | 70 | 80 | 8F | 9F | AF | BF | CF | DF | EF |

FIG. 6B

C ROM DATA

| ADDRESS (LOWER) | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| (UPPER) | | | | | | | | | | | | | | | | |
| 00 | 09 | 09 | 0C | 0C | 06 | 06 | 03 | 03 | 09 | 09 | 0C | 0C | 06 | 06 | 03 | 03 |
| 01 | 09 | 09 | 0C | -- | -- | | | | | | | | | | | |
| ⋮ | | | | | | | | | | | | | | | | |
| 0F | 09 | 09 | 0C | 0C | 06 | 06 | 03 | 03 | 09 | 09 | 0C | 0C | 06 | 06 | 03 | 03 |
| 10 | 09 | 09 | 09 | 09 | 0C | 0C | 0C | 0C | 06 | 06 | 06 | 06 | 03 | 03 | 03 | 03 |
| 11 | 09 | 09 | 09 | -- | -- | | | | | | | | | | | |
| ⋮ | | | | | | | | | | | | | | | | |
| 1F | 09 | 09 | 09 | 09 | 0C | 0C | 0C | 0C | 06 | 06 | 06 | 06 | 03 | 03 | 03 | 03 |
| 20 | 09 | 09 | 09 | 09 | 09 | 09 | 09 | 09 | 0C | 0C | 0C | 0C | 0C | 0C | 0C | 0C |
| 21 | 06 | 06 | 06 | 06 | 06 | 06 | 06 | 06 | 03 | 03 | 03 | 03 | 03 | 03 | 03 | 03 |
| 22 | 09 | 09 | 09 | 09 | 09 | 09 | 09 | 09 | 0C | 0C | 0C | 0C | 0C | 0C | 0C | 0C |
| 23 | 06 | 06 | 06 | 06 | 06 | 06 | 06 | 06 | 03 | 03 | 03 | 03 | 03 | 03 | 03 | 03 |
| 24 | 09 | 09 | 09 | -- | -- | | | | | | | | | | | |
| ⋮ | | | | | | | | | | | | | | | | |
| 2F | 06 | 06 | 06 | 06 | 06 | 06 | 06 | 06 | 03 | 03 | 03 | 03 | 03 | 03 | 03 | 03 |
| 30 | 09 | 09 | 09 | 09 | 09 | 09 | 09 | 09 | 09 | 09 | 09 | 09 | 09 | 09 | 09 | 09 |
| 31 | 0C | 0C | 0C | 0C | 0C | 0C | 0C | 0C | 0C | 0C | 0C | 0C | 0C | 0C | 0C | 0C |
| 32 | 06 | 06 | 06 | 06 | 06 | 06 | 06 | 06 | 06 | 06 | 06 | 06 | 06 | 06 | 06 | 06 |
| 33 | 03 | 03 | 03 | 03 | 03 | 03 | 03 | 03 | 03 | 03 | 03 | 03 | 03 | 03 | 03 | 03 |
| 34 | 09 | 09 | 09 | 09 | 09 | 09 | 09 | 09 | 09 | 09 | 09 | 09 | 09 | 09 | 09 | 09 |
| 35 | 0C | 0C | 0C | 0C | 0C | 0C | 0C | 0C | 0C | 0C | 0C | 0C | 0C | 0C | 0C | 0C |
| 36 | 06 | 06 | 06 | 06 | 06 | 06 | 06 | 06 | 06 | 06 | 06 | 06 | 06 | 06 | 06 | 06 |
| 37 | 03 | 03 | 03 | 03 | 03 | 03 | 03 | 03 | 03 | 03 | 03 | 03 | 03 | 03 | 03 | 03 |
| 38 | 09 | 09 | 09 | | | | | | | | | | | | | |
| ⋮ | | | | | | | | | | | | | | | | |
| 3F | 03 | 03 | 03 | 03 | 03 | 03 | 03 | 03 | 03 | 03 | 03 | 03 | 03 | 03 | 03 | 03 |

FIG. 6C

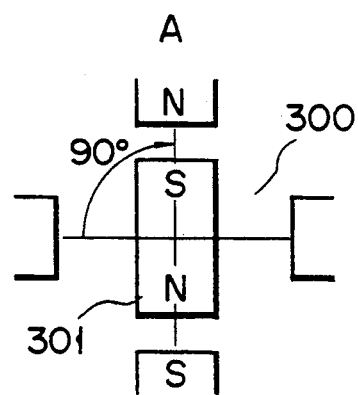
F I G. 9A
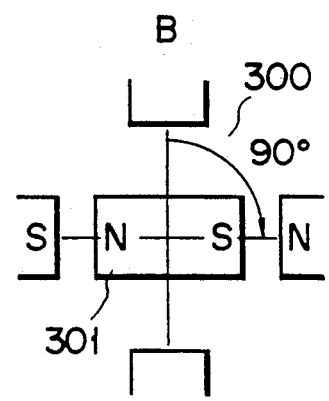
F I G. 9B
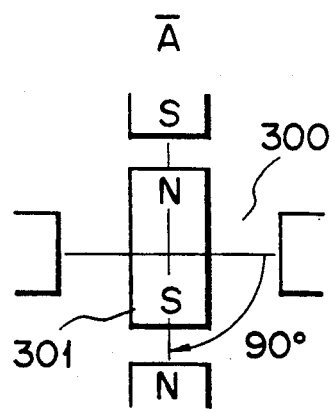
F I G. 9C
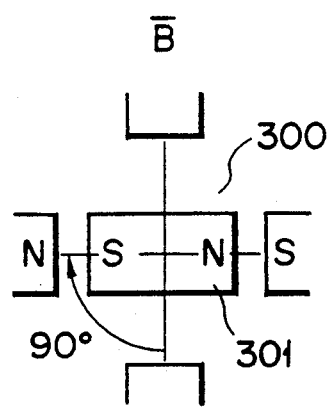
F I G. 9D

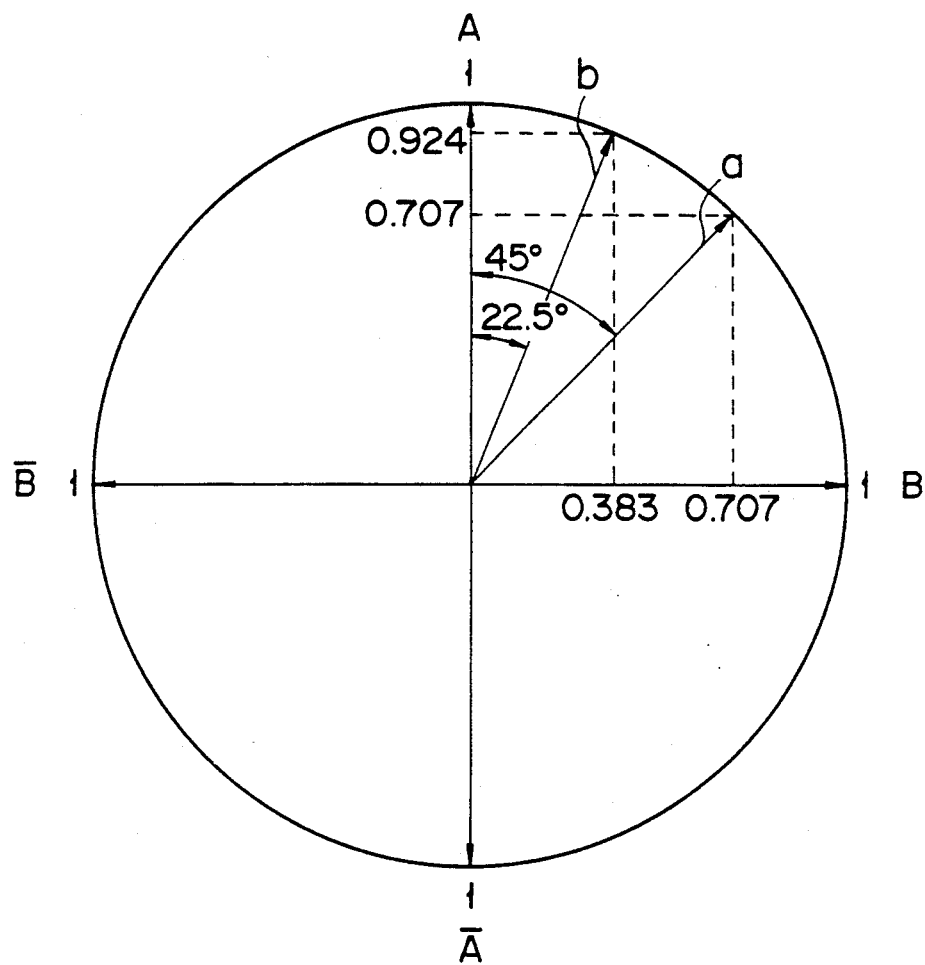
F I G. 10

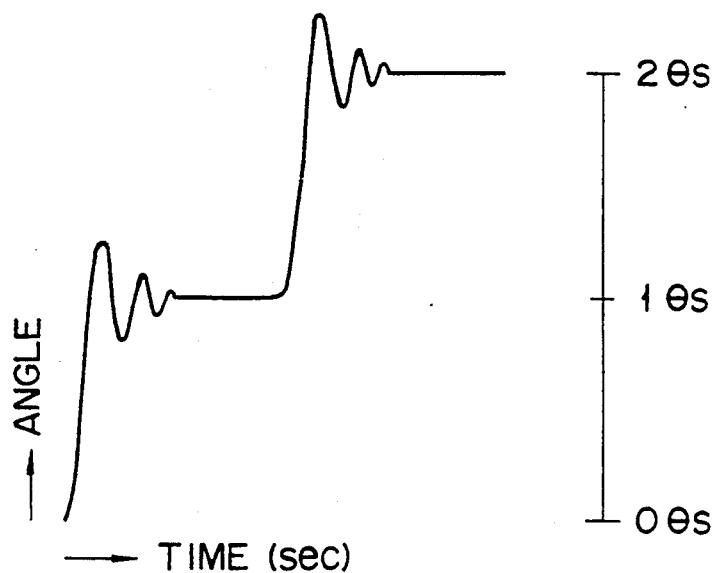
F I G. 12A
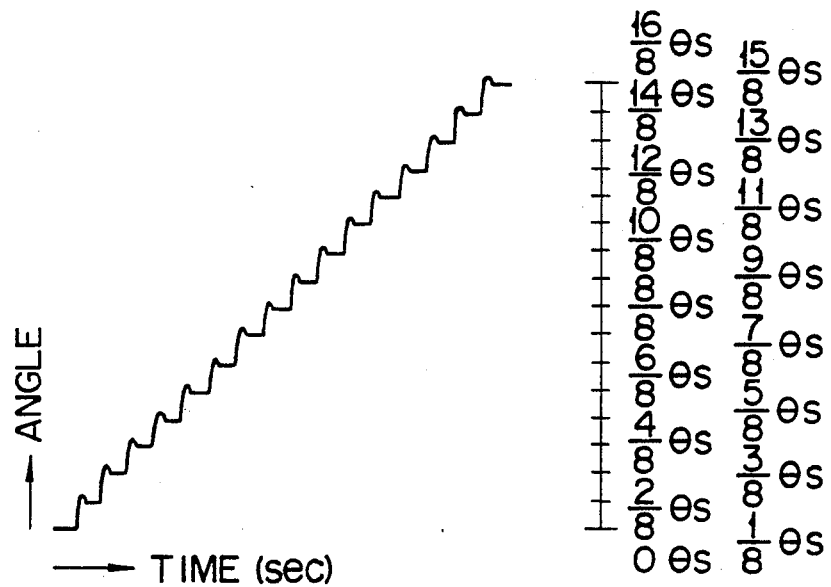
F I G. 12B

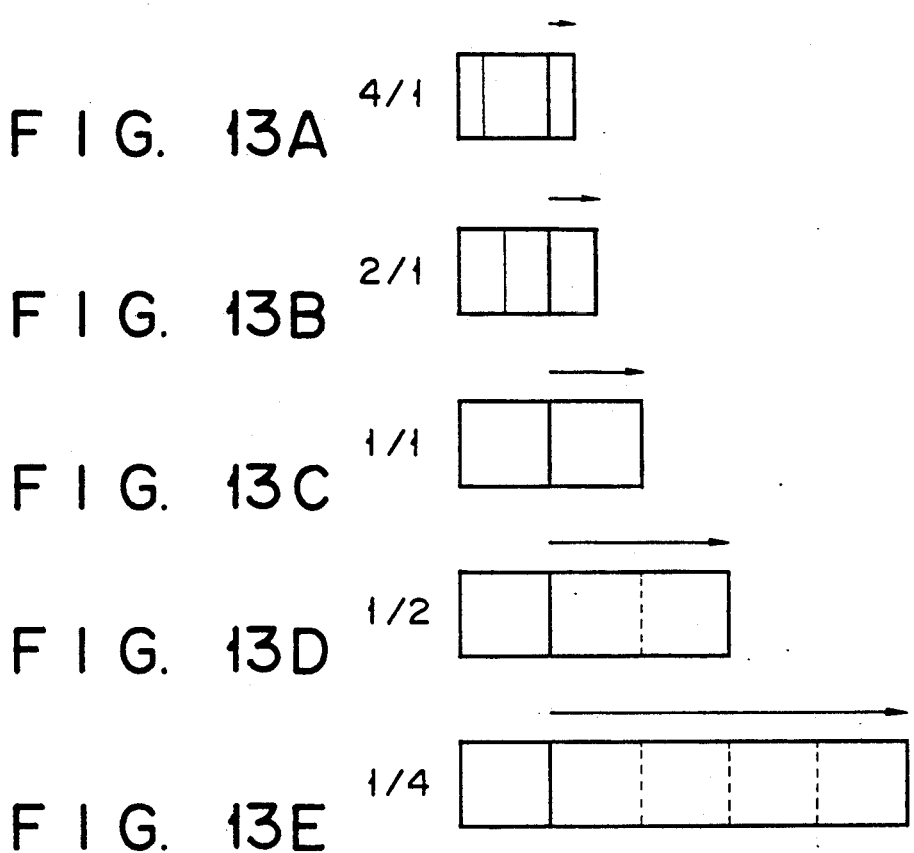
FIG. 13A
FIG. 13B
FIG. 13C
FIG. 13D
FIG. 13E
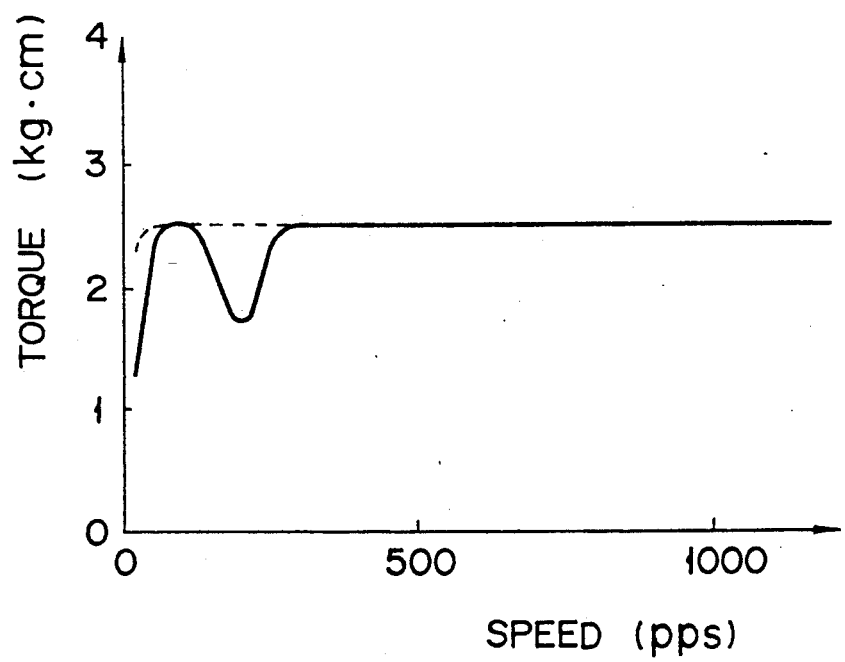
FIG. 14

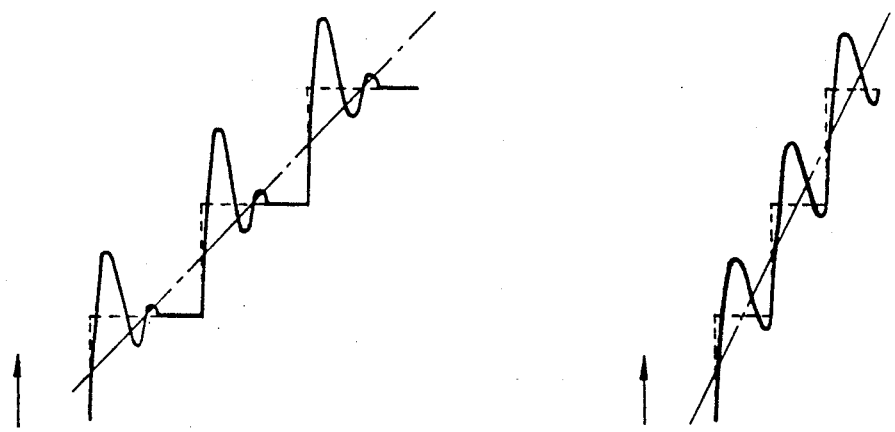
F I G. 15A
F I G. 15B
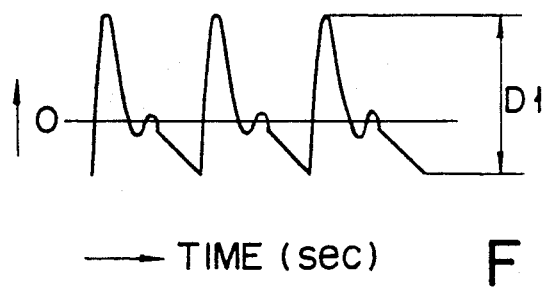
F I G. 15C
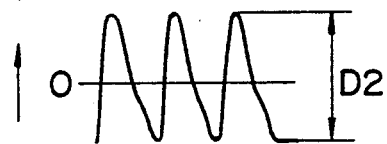
F I G. 15D

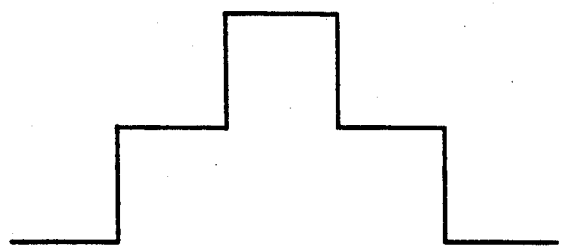
F I G. 16A
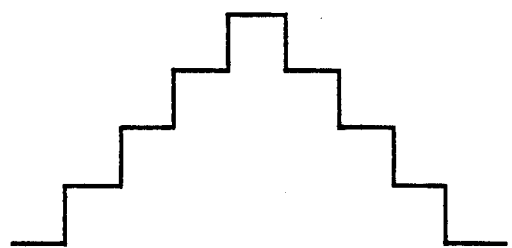
F I G. 16B
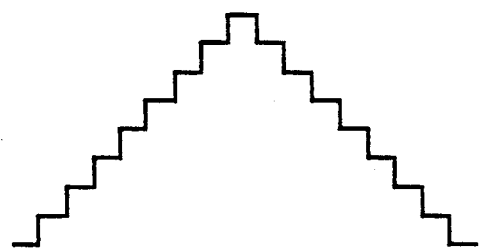
F I G. 16C
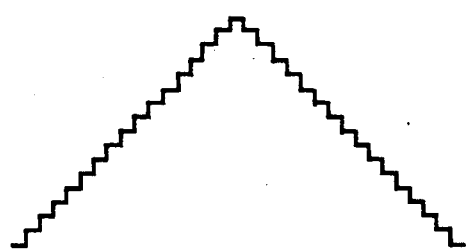
F I G. 16D

A ROM DATA

| ADDRESS (LOWER) | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| (UPPER) | | | | | | | | | | | | | | | | |
| 00 | 00 | 08 | 10 | 18 | 20 | 28 | 30 | 38 | 40 | 38 | 30 | 28 | 20 | 18 | 10 | 08 |
| 01 | 00 | | | -- | -- | -- | | | ⋮ | | | | | | | ⋮ |
| ⋮ | | | | | | | | | | | | | | | | |
| 0F | 00 | 08 | 10 | 18 | 20 | 28 | 30 | 38 | 40 | 38 | 30 | 28 | 20 | 18 | 10 | 08 |
| 10 | 00 | 10 | 20 | 30 | 40 | 50 | 60 | 70 | 80 | 70 | 60 | 50 | 40 | 30 | 20 | 10 |
| 11 | 00 | 10 | 20 | -- | -- | -- | | | ⋮ | | | | | | | ⋮ |
| ⋮ | | | | | | | | | | | | | | | | |
| 1F | 00 | 10 | 20 | 30 | 40 | 50 | 60 | 70 | 80 | 70 | 60 | 50 | 40 | 30 | 20 | 10 |
| 20 | 00 | 18 | 30 | 48 | 60 | 78 | 90 | A8 | C0 | A8 | 90 | 78 | 60 | 48 | 30 | 18 |
| 21 | 00 | 1F | 3F | -- | -- | -- | | | ⋮ | | | | | | | ⋮ |
| ⋮ | | | | | | | | | | | | | | | | |
| 2F | 00 | 18 | 30 | 48 | 60 | 78 | 90 | A8 | C0 | A8 | 90 | 78 | 60 | 48 | 30 | 18 |
| 30 | 00 | 1F | 3F | 5F | 7F | 9F | BF | DF | FF | DF | BF | 9F | 7F | 5F | 3F | 1F |
| 31 | 00 | 1F | 3F | -- | -- | -- | | | ⋮ | | | | | | | ⋮ |
| ⋮ | | | | | | | | | | | | | | | | |
| 3F | 00 | 1F | 3F | 5F | 7F | 9F | BF | DF | FF | DF | BF | 9F | 7F | 5F | 3F | 1F |

F I G. 17A

B R̄OM DATA

ADDRESS

| (LOWER) (UPPER) | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00 | 40 | 38 | 30 | 28 | 20 | 18 | 10 | 08 | 00 | 08 | 10 | 18 | 20 | 28 | 30 | 38 |
| 01 | 40 | 38 | 30 | -- | -- | | | | | | | | | | | |
| ⋮ | | | | | | | | | | | | | | | | |
| 0F | 40 | 38 | 30 | 28 | 20 | 18 | 10 | 08 | 00 | 08 | 10 | 18 | 20 | 28 | 30 | 38 |
| 10 | 80 | 70 | 60 | 50 | 40 | 30 | 20 | 10 | 00 | 10 | 20 | 30 | 40 | 50 | 60 | 70 |
| 11 | 80 | 70 | 60 | -- | -- | | | | | | | | | | | |
| ⋮ | | | | | | | | | | | | | | | | |
| 1F | 80 | 70 | 60 | 50 | 40 | 30 | 20 | 10 | 00 | 10 | 20 | 30 | 40 | 50 | 60 | 70 |
| 20 | C0 | A8 | 90 | 78 | 60 | 48 | 30 | 18 | 00 | 18 | 30 | 48 | 60 | 78 | 90 | A8 |
| 21 | C0 | A8 | 90 | -- | -- | | | | | | | | | | | |
| ⋮ | | | | | | | | | | | | | | | | |
| 2F | C0 | A8 | 90 | 18 | 60 | 48 | 30 | 18 | 00 | 18 | 30 | 48 | 60 | 78 | 90 | A8 |
| 30 | FF | DF | BF | 9F | 7F | 5F | 3F | 1F | 00 | 1F | 3F | 5F | 7F | 9F | BF | DF |
| 31 | FF | DF | BF | -- | -- | | | | | | | | | | | |
| ⋮ | | | | | | | | | | | | | | | | |
| 3F | FF | DF | BF | 9F | 7F | 5F | 3F | 1F | 00 | 1F | 3F | 5F | 7F | 9F | BF | DF |

F I G. 17B

C ROM DATA

| ADDRESS (LOWER) | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| (UPPER) | | | | | | | | | | | | | | | | |
| 00 | 09 | 09 | 09 | 09 | 09 | 09 | 09 | 09 | 0C | 0C | 0C | 0C | 0C | 0C | 0C | 0C |
| 01 | 06 | 06 | 06 | 06 | 06 | 06 | 06 | 06 | 03 | 03 | 03 | 03 | 03 | 03 | 03 | 03 |
| 02 | 09 | 09 | 09 | 09 | 09 | 09 | 09 | 09 | 0C | 0C | 0C | 0C | 0C | 0C | 0C | 0C |
| 03 | 06 | 06 | 06 | 06 | 06 | 06 | 06 | 06 | 03 | 03 | 03 | 03 | 03 | 03 | 03 | 03 |
| 04 | 09 | 09 | 09 | | | | | | | | | | | | | |
| ⋮ | | | | | | | | | | | | | | | | |
| 3F | 06 | 06 | 06 | 06 | 06 | 06 | 06 | 06 | 03 | 03 | 03 | 03 | 03 | 03 | 03 | 03 |

F I G. 17C

IMAGE READING APPARATUS FOR READING A DOCUMENT AT A SPEED CORRESPONDING TO THE DOCUMENT READING DENSITY

BACKGROUND OF THE INVENTION

1. Field of the Invention

The present invention relates to an image reading apparatus for scanning a document and reading image data of the document.

2. Description of the Related Art

An apparatus for processing image data such as a facsimile apparatus or a digital copying machine is provided with an image reading apparatus for scanning a document, reading image data of the document, and outputting an image signal. The image reading apparatus places the document on a document table, scans the document by means of a scanner in which a photosensor, etc. are built in, and reads image data of the document. In the image reading apparatus used in a facsimile apparatus, while a document is transferred by a document transfer device, image data is read from the document. In this manner, the image data is obtained while the document and the document reader for reading this document are moved relative to each other.

A pulse motor is employed for the scanner and document transfer device for moving the document and the document reader. In accordance with the rotation of the pulse motor, the document is scanned. In this type of the image reading apparatus, in order to change the document reading magnification, the scan density in a sub-scanning direction is changed. To change the scan density, the rotation speed of the pulse motor is changed, and accordingly the moving speed of the scanner and the transfer speed of the document transfer device are changed. For this purpose, the frequency of an excitation pulse to be supplied to the pulse motor is changed.

The pulse motor has a natural frequency. When the natural frequency of the motor and the frequency of the excitation pulse coincide with each other, there is a concern that a resonance or hunching occurs in the pulse motor and an obtained image may blur. It is thus necessary that the scan density at the time of reading the image data of the document be set in a range excluding a resonance range corresponding to the natural frequency of the pulse motor. Consequently, it is not allowed to freely set the scan density. Under the circumstances, there is an increasing expectancy for the advent of an image reading apparatus wherein a read image is stable.

SUMMARY OF THE INVENTION

An object of the present invention is to provide an image reading apparatus wherein the blurring of an image, occurring at the time of reading a document, is prevented.

The present invention provides an image reading apparatus comprising a document reader for reading an image of a document; a driving device including a pulse motor for moving the document reader and the document relative to each other; a pulse generator for generating an exciting signal for driving the pulse motor; and a motor control circuit for changing the waveform of an exciting current supplied to the pulse motor, in accordance with the reading density, when the exciting signal is generated from the pulse generator to the motor control circuit.

In the present invention, even when the reading density for reading a document is varied, the pulse motor can be driven in accordance with the reading density. Thus, the damping oscillation of the pulse motor can be suppressed, and the deflection of image, which would occur at the time of reading the document, can be reduced. As a result, stable image reading is ensured.

BRIEF DESCRIPTION OF THE DRAWINGS

FIG. 1 schematically shows a structure of an image reading apparatus according to an embodiment of the present invention;

FIG. 2 schematically shows a structure of a driving system for driving a transfer unit used in the image reading apparatus shown in FIG. 1;

FIG. 5 is a circuit diagram showing a signal generating circuit of the control system shown in FIG. 4;

FIGS. 6A to 6C show data units stored in a read-only memory in the signal generating circuit shown in FIG. 5;

FIGS. 9A to 9G show various states of a rotor of a pulse motor used in the present invention;

FIG. 10 shows torque vectors of the pulse motor used in the present invention;

FIGS. 12A and 12B show response characteristics of the rotation of the pulse motor;

FIGS. 13A to 13E show relationships between the reading density and the scan speed of the image reading apparatus shown in FIG. 1;

FIGS. 14 shows a torque curve of the pulse motor;

FIGS. 15A to 15H show relationships between the rotation angle and the damping oscillation of the pulse motor;

FIGS. 16A to 16D show waveforms of various excitation currents flowing in the winding of the pulse motor;

FIGS. 17A to 17C show data units stored in the read-only memory in the waveform generating circuit, according to another embodiment of the present invention;

DETAILED DESCRIPTION OF THE PREFERRED EMBODIMENTS

Figure 3:
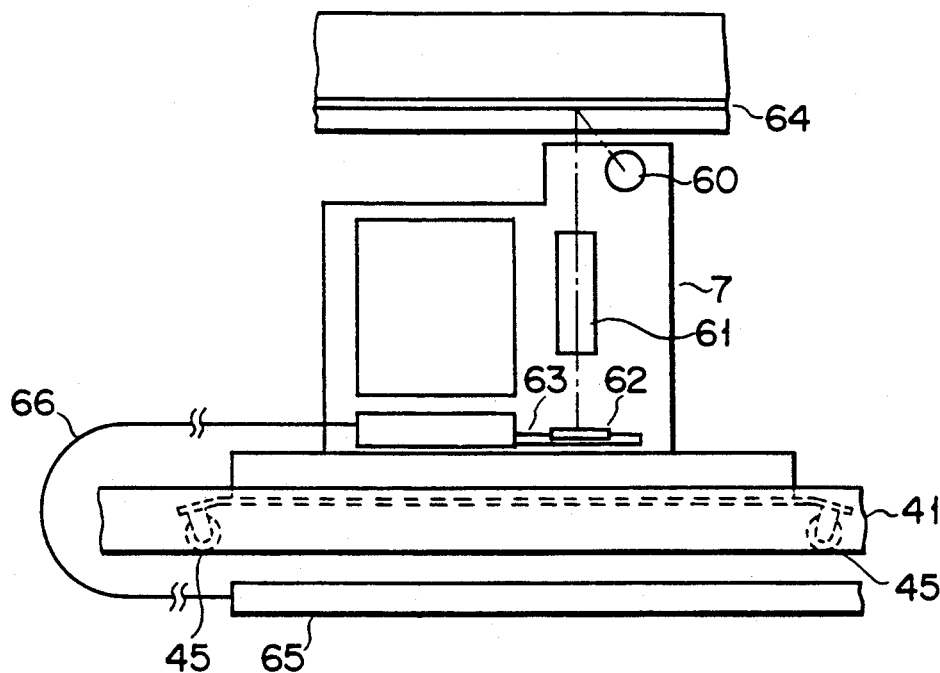
FIG. 3 schematically shows a structure of a reading unit used in the image reading apparatus shown in FIG. 1.

An image reading apparatus 1 shown in FIG. 1 comprises a main unit 2, document table unit 3 mounted on the main unit 2, and a document table unit 4 provided on one side of the document table unit 3. According to the image reading apparatus 1, a document placed between an exposure glass 5 of the document table 3 and a platen cover 6 is read by a reading unit 7 mounted movably in the main unit 2. Alternatively, the document is transferred by a document transfer unit 4, and is read by the reading unit 7 located below the document transfer unit 4. In this case, the document, inserted from the platen cover (6) side, is transferred by rollers 8, 9, 10, 11, 12, 13, 14 and 15 and is discharged onto the upper surface of the platen cover 6.

As described above, the image reading apparatus 1 has two reading modes, i.e., one being the reading mode with the document being fixed, and the other being the reading mode with the document being transferred.

Within the main unit 2 of the image reading apparatus 1, there are the reading unit 7 having an optical system and a photosensor (an image sensor), a moving unit 16 for moving the reading unit 7, and a cooling fan 17 for cooling the inside of the main unit 2. The reading unit 7 is moved from end to end within the main unit 2. With the movement of the reading unit 7, the document on the exposure glass 5 is read.

The reading unit 7 is provided with a wire. The wire is moved by the moving unit 16 to move the reading unit 7. The cooling fan 17 is provided at one end of the main unit 2, to prevent a temperature rise in the main unit 2.

The document transfer unit 4 is arranged o,.n the same side as the cooling fan 17, and above it. The document transfer unit 4 receives the document inserted from a document inlet 18. The document transfer unit 4 has, inside, rollers 8, 9, 10, 11, 12, 13, 14, and 15 which constitute a transfer path 19. The transfer path 19 guides the document to the reading unit 7, when the reading unit 7 has reached the position below the document transfer unit 4. The document fed from the reading unit 7 is discharged to the outside through an outlet 20 formed on the upper side of the document transfer unit 4.

The document table unit 3 is constituted by the exposure glass 5 on which the document is placed, and the platen cover 6 for covering the exposure glass 5 and the document. The platen cover 6 is swingably attached, at one side, to the document transfer unit 4. In the state that the platen cover 6 is closed, the document table unit 3 can receive the document from the document inlet 18. In this case, the document placed on the platen cover 6 is inserted from the document inlet 18.

The moving unit 16 for moving the reading unit 7 of the image reading apparatus 1 will now be described.

As shown in FIG. 2, a driving system of the moving unit 16 is disposed within the main unit 2, and serves to move the reading unit 7 from end to end in the main unit 2. The moving unit 16 comprises a pair of rails 40 and 41 extending from one end to the other of the apparatus, a wire 42 passed along the rails 40 and 41, pulleys 43a, 43b, 43c, 43d and 43e for movably supporting the wire 42, and a driving unit 44 for moving the wire 42.

The reading unit 7 is arranged perpendicularly to the rails 40 and 41. Wheels 45 are arranged below the reading unit 7. The wheels 45 are bought into contact with the rails 40 and 41, so that the reading unit 7 may be movable. The pulleys 43a to 43e are arranged at four corners of the paired rails 40 and 41. Also, a driven pulley 46 to be driven by the driving unit 44 is arranged at one of the four corners of the rails 40 and 41. The wire 42, which extends in an endless manner, is passed over the pulleys 43a to 43e and driven pulley 46 so as to describe rectangular figures. The reading unit 7 is attached to the wire 42 by fixing members 47. In accordance with the movement of the wire 42, the reading unit 7 is moved.

The driving unit 48 comprises a pulse motor 48, a driving pulley 49, the driven pulley 46, and a belt 50. The rotational force of the pulse motor 48 is transmitted to the driving pulley 49 attached to the rotation shaft of the pulse motor 48. Since the belt 50 is passed between the driving pulley 49 and the driven pulley 46, the rotation of the pulse motor 48 is transmitted to the driven pulley 46. In accordance with the rotation of the pulse motor 48, the driven pulley 46 is rotated in the direction of arrow A or arrow B. Since the wire 42 is passed over the driven pulley 46, the wire 4 is moved in accordance with the rotation of the pulse motor 48. Further, since the reading unit 7 is fixed to the wire 42, the reading unit 7 is moved in the direction of arrow A' or arrow B' in accordance with the rotation of the pulse motor 48.

The structure of the reading unit 7 will now be described.

The reading unit 7 shown in FIG. 3 is movably supported on the rails 40 and 41 by the wheels 45 which are provided below the reading unit 7. The reading unit 7 comprises an exposure lamp 60, a SELFOC lens 61, a charge coupling device 62, a CCD driver 63, etc. A xenon lamp is used as the exposure lamp 60. The SELFOC lens 61 has a angular aperture of 9 degrees and a conjugate length of 48. The exposure lamp 60 is situated in a position corresponding to the exposure glass 5, and illuminates a document 64 on the exposure glass 5. The SELFOC lens 61 for guiding a light beam reflected from the document is arranged within the reading unit 7 below the point where the the document 64 is illuminated. The CCD 62 is provided below the SELFOC lens 61. In other words, when the document 64 is exposed by the exposure lamp 60, the light reflected from the document 64 is guided by the SELFOC lens 61 to the CCD 62. The CCD 62 converts the image light to an electric signal, i.e., an image signal. The image signal is supplied through the CCD driver 63 and a cable 66 to a binary-coding unit 65. The binary-coding unit 65 is arranged within the main unit 2, and subjects the image signal to binary-coding processing.

A driving circuit for driving the pulse motor 48 in the moving unit 16 for moving the reading unit 7 in the image reading apparatus 1 will now be described.

In the image reading apparatus 1, the reading density, with which the document is read, is variable. Thus, in the image reading apparatus 1, the scanning speed for scanning the document is varied in accordance with the reading density. In order to change the scanning speed, the driving circuit changes the driving frequency of the pulse motor in accordance with the reading density. The driving circuit gradually increases an exciting current flowing in the coil of the pulse motor 48 up to a predetermined value or gradually decreases the exciting current. In the driving circuit, one cycle of the exciting current flowing in the coil is divided into a plurality of cycle components, and the the current is increased or decreased for each cycle component. Namely, the exciting current flowing in the coil of the pulse motor is controlled such that the waveform of the exciting current takes a step-like shape.

In the image reading apparatus 1, when the scanning speed is changed in accordance with the reading density of the document, the waveform of the exciting current flowing in the coil of the pulse motor is changed in stepwise manner, in accordance with the scanning speed. When the scanning speed is high, the number of steps of the stepwise waveform is decreased. On the other hand, when the scanning speed is low, the number of such steps is increased. In this manner, the driving circuit of the pulse motor 48 controls the exciting current supplied to the pulse motor.

Figure 4:
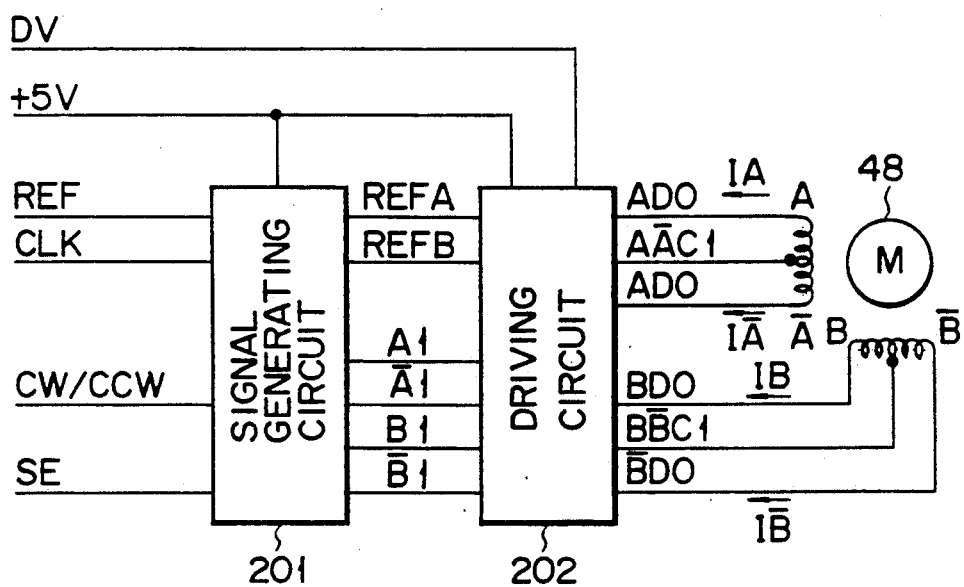
FIG. 4 is a block diagram showing a control system for controlling the transfer unit driving system shown in FIG. 2.

A circuit structure of the driving circuit for driving the pulse motor 48 is shown in FIG. 4. This driving circuit comprises a signal generating circuit 201 for generating signals for controlling the rotation of the pulse motor 48, and a constant-current type driving circuit 202 for driving the pulse motor 48. The signal generating circuit 201 receives a reference voltage REF, a clock pulse CLK and a switching signal CW/CCW and outputs an A-phase reference signal REFA, a B-phase reference signal REFB and exciting signals A1, $\overline{A1}$, B1 and $\overline{B1}$. The reference voltage REF serves as a reference voltage of the A-phase reference signal REFA and the B-phase reference signal REFB. The clock pulse CLK serves as a clock for driving the signal generating circuit 201. The switching signal CW/CCW is a signal for switching the rotational direction of the pulse motor 48. The switching signal CW/CCW switches the counter mode of the signal generating circuit 201 between the count-up mode and the count-down mode. Namely, when the value of the switching signal CW/CCW is "1", the counter in the signal generating circuit 201 counts up. When the value of the switching signal CW/CCW is "0", the counter counts down.

The constant-current type driving circuit 202 receives a pulse motor driving voltage DV, the A-phase reference signal REFA, the B-phase reference signal REFB and the excitation signals A1, $\overline{A1}$, B1 an $\overline{B1}$ and controls the exciting currents supplied to an A-phase winding, B-phase winding, C-phase winding and D-phase winding.

A description will now be given of the signal generating circuit 201 in the pulse motor driving circuit.

Figures 5, 6A:
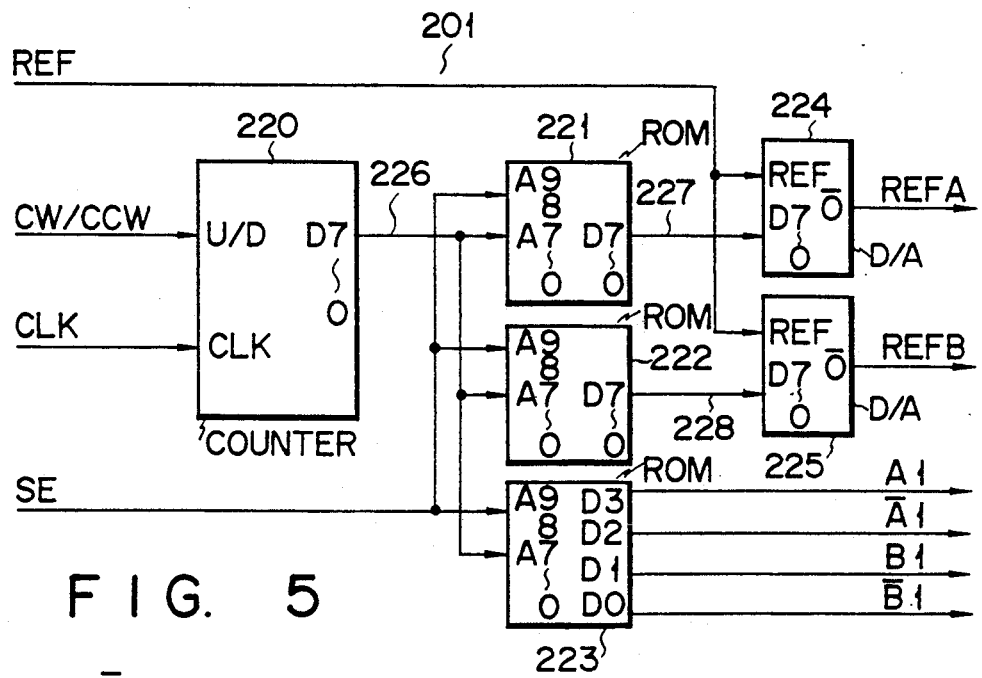

The signal generating circuit 201 shown in FIG. 5 generates signals necessary for driving the pulse motor 48, in accordance with data stored in a read-only memory (ROM). The signal generating circuit 201 comprises an 8-bit counter, a ROM 221, a ROM 222, a ROM 223, and 8-bit digital/analog converters (D/A converter) 224 and 225.

The counter 220 receives the clock pulse CLK and the switching signal CW/CCW. The clock pulse CLK is formed by an oscillator (not shown). The switching signal CW/CCW serves to switch the rotational direction of the pulse motor 48. When the value of the switching signal CW/CCW is "1", the counter 22 counts up. On the other hand, when the value of the switching signal CW/CCW is "0", the counter 22 counts down. The counter 220 counts the clock pulse CLK. At the time of counting-up, the counted value "FF" is followed by "00". At the time of counting-down, the counted value "00" is followed by "FF".

Outputs of the counter 220 are fed through 8-bit data buses 226 to the ROMs 221, 222 and 223. Simultaneously, a select signal SE is input to the ROMs 221, 222 and 223. The select signal SE serves to select the number of steps of the stepwise waveform so as to smooth the rising or falling of the excitation currents supplied to the coils of the pulse motor 48. In accordance with the select signal SE, the number of steps of the stepwise waveform of the signal, which is output from the signal generating circuit 201 to control the exciting currents flowing through the coils of the pulse motor 48, is changed. The outputs from the counter 220 and the select signal SE are indicative of the addresses in the ROMs 221, 222 and 223. The ROM 221 stores the data for forming the waveform of the A-phase reference signal REFA. The ROM 221 has four divided memory areas which store data units of the respective steps of the stepwise waveform of the exciting currents supplied to the pulse motor 48. The ROM 211 can designate addresses from "000" (hexadecimal number) to "3FF" (hexadecimal number). The upper two bits of each address vary in accordance with the select signal SE, and the lower eight bits thereof vary in accordance with the output from the counter 220. Thus, the region of ROM 221 for the addresses from "000" (hexadecimal number) to "0FF" (hexadecimal number) stores two-step waveform data units. The region of ROM 221 for the addresses from "100" (hexadecimal number) to "1FF" (hexadecimal number) stores four-step waveform data units. The region of ROM 221 for the addresses from "200" (hexadecimal number) to "2FF" (hexadecimal number) stores eight-step waveform data units. Also, the region of ROM 221 for the addresses from "300" (hexadecimal number) to "3FF" (hexadecimal number) stores 16-step waveform data units.

The ROM 222 stores the data for forming a waveform of the B-phase reference signal REFB. Like ROM 221, the ROM 222 has four divided regions which store data units corresponding to the respective steps of the excitation signals supplied to the pulse motor 48. The ROMs 221 and 222 output 8-bit data signals.

The ROM 223 stores the data corresponding to the excitation signals A1, $\overline{A1}$, B1, and $\overline{B1}$ for driving the pulse motor 48. Like ROM 221, the ROM 223 has four divided regions which store the data of the excitation signals A1, $\overline{A1}$, B1, and $\overline{B1}$ for controlling the ON/OFF of the exciting currents supplied to the pulse motor 48. From the ROM 223, data is output with the lower four bits. The output values of the lower four bits become the excitation signals A1, $\overline{A1}$, B1 and $\overline{B1}$.

An output of the ROM 221 is input to a D/A converter 224 through a data bus 227. The D/A converter 224 receives the output from the ROM 221 and the reference voltage REF, and converts the output from the ROM 221 into an analog signal. The resulting analog signal is output as the A-phase reference signal REFA.

An output of the ROM 222 is input to the D/A converter 225 through a data bus 228. The D/A converter 225 receives the output from the ROM 222 and the reference voltage REF, and converts the output from the ROM 222 into an analog signal. The resulting analog signal is output as the B-phase signal REFB.

The data units stored in the ROM 221 of the signal generating circuit 201 are shown in FIG. 6A, those stored in the ROM 222 are shown in FIG. 6B, and those stored in the ROM 223 are shown in FIG. 6C. FIGS. 6A to 6C show numerical values by hexadecimal numbers. These figures show address values and the data units indicated by the addresses. For example, in FIG.

6A, data "00" (hexadecimal) is stored at address "000" (hexadecimal), data "80" (hexadecimal) is stored at address "FF" (hexadecimal), data "3F" (hexadecimal) is stored at address "002" (hexadecimal). The ROM 221 stores the current value setting data used in the D/A converter 224. The ROM 222 shown in FIG. 6B stores the current value setting data used in the D/A converter 225. Since the data stored in the ROM 223 shown in FIG. 6C is expressed by using only the lower four bits, the upper four bits have value "0" (hexadecimal number). The data units corresponding to excitation signals A1, $\overline{A1}$, B1, and $\overline{B1}$ are stored in the ROM 223. The outputs of the counter 220 are supplied commonly to the ROM 221, ROM 222 and ROM 223. Thus, the ROMs 221, 222 and 223 simultaneously output the values of the data indicated by the same address. In this manner, the A-phase reference signal REFA, the B-phase reference signal REFB, and the excitation signals A1, $\overline{A1}$, B1 and $\overline{B1}$ can be easily synchronized.

Figure 7:
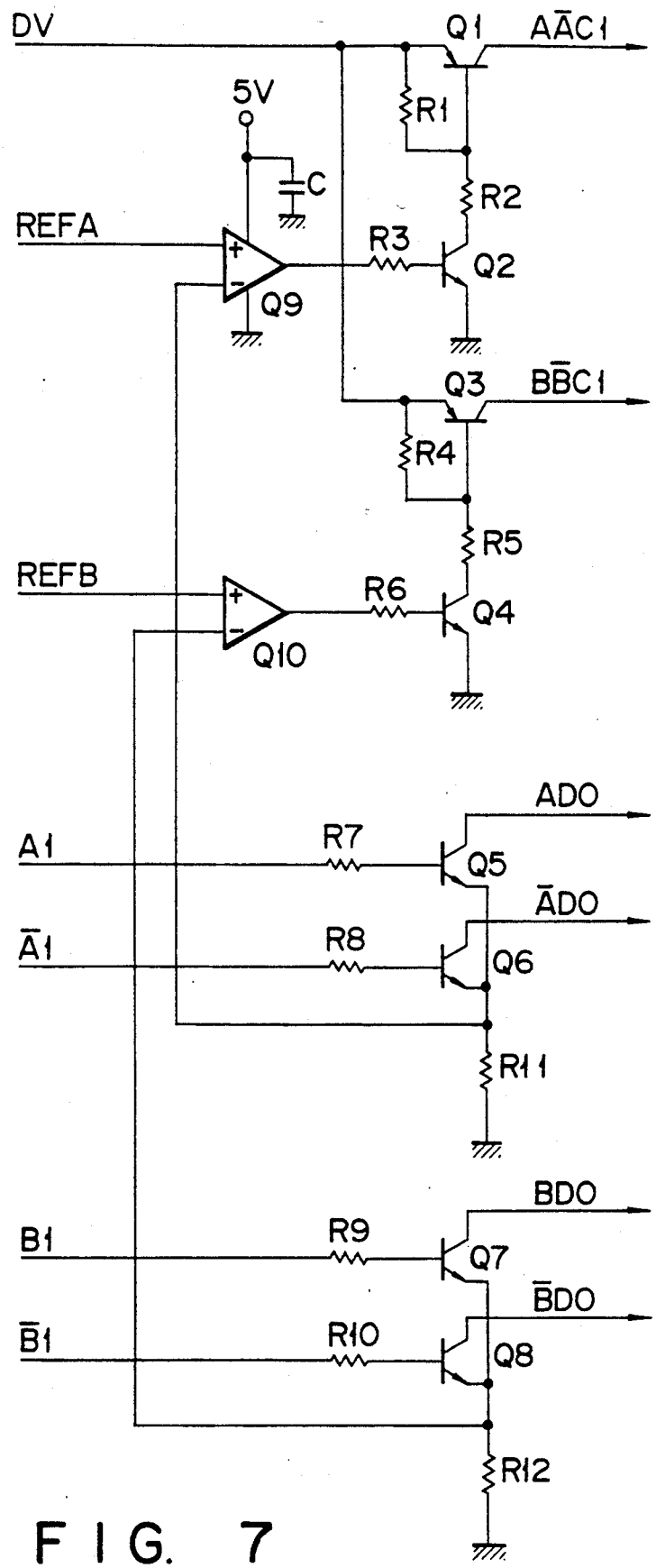
FIG. 7 is a circuit diagram showing a constant-current type driving circuit shown in FIG. 5.

The constant-current type driving circuit 202 in the driving circuit for driving the pulse motor 48 will now be described with reference to FIG. 7. The constant-type driving circuit 202 comprises transistors Q1 and Q3 for controlling the driving voltage DV, transistors Q2 and Q4 for controlling the transistors Q1 and Q3, transistors Q5, Q6, Q7 and Q8 for receiving the excitation signals A1, $\overline{A1}$, B1 and $\overline{B1}$, a comparator Q9 for receiving the A-phase reference signal REFA, a comparator Q10 for receiving the B-phase reference signal REFB, and resistors R1, R2, R3, R4, R5, R6, R7, R8, R9, R10, R11 and R12.

The driving voltage DV is supplied through the transistor Q1 to an A-phase/A-phase winding common element AAC1. A resistor R1 is connected between the base and emitter of the transistor Q1. The A-phase reference signal REFA is input to the positive (+) input terminal of the comparator Q9. On the other hand, a voltage signal proportional to the exciting current is input to the negative (−) input terminal of the comparator Q9. An input of the comparator Q9 is supplied to the base of the transistor Q2 through a resistor R3. The collector of the transistor Q2 is connected to the base of the transistor Q1 through a resistor R2. Thus, the transistor Q1 is controlled in accordance with the A-phase reference signal REFA and the excitation signals A1 and The driving voltage DV is applied to a B-phase/$\overline{B}$-phase winding common terminal B$\overline{B}$C1 of the pulse motor 48 through the transistor Q3. Like the transistor Q1, the transistor Q3 is connected to the comparator Q10, transistor Q4, and resistors R4, R5 and R6, and is controlled in accordance with the B-phase reference signal and the excitation signals B1 and $\overline{B1}$.

The excitation signal A1 is input to the base of the transistor Q5 through a resistor R7. The collector of the transistor Q5 is connected to an A-phase winding terminal ADO of the pulse motor 48. The excitation signal $\overline{A1}$ is input to the base of the transistor Q6 through a resistor R8. The excitation signal $\overline{A1}$ is input to the base of the transistor Q6 through a resistor R8. The collector of the transistor Q6 is connected to an $\overline{A}$-phase winding terminal ADO of the pulse motor 48. The emitters of transistors Q5 and Q6 are connected to the comparator Q9 and are grounded through a resistor R11.

The excitation signal B1 is input to the base of transistor Q7 through a resistor R9. The collector of the transistor Q7 is connected to a B-phase winding terminal BDO of the pulse motor 48. The excitation signal B1 is input to the base of transistor Q8 through a resistor R10. The collector of transistor Q8 is connected to a $\overline{B}$-phase winding terminal $\overline{B}$DO of the pulse motor 48. The emitters of transistors Q7 and Q8 are connected to the comparator Q10, and are grounded through a resistor R12.

The operation of the constant-current type driving circuit 202 will now be described.

When the value of excitation signal A1 is "0" (the value of excitation signal $\overline{A1}$ is also "0"), the transistor Q5 is turned off (the transistor Q6 is also turned off). When the transistor Q5 is turned off, no current flows through the resistor R11 connected to the emitter of transistor Q5, and the voltage of the resistor R11 on the transistor Q5 side is 0 V. Thus, the voltage applied to the (−) input terminal of comparator Q9 is 0 V. In this case, if the potential of A-phase reference signal REFA supplied to the (+) input terminal of comparator Q9 is 0 V or more, the output of comparator Q9 is 5 V. An output of 5 V from the comparator Q9 is supplied to the base of transistor Q2, and the transistor Q2 is turned on. Also, a voltage of 0.6 V or more is produced across the resistor R1, and the transistor Q1 is turned on. Consequently, the driving voltage DV is supplied to the A-phase coil common terminal of the pulse motor 48. However, since the transistor Q5 is in the OFF state, no current flows through the A-phase coil of the pulse motor 48.

When the excitation signal A1 is "1" (the excitation signal $\overline{A1}$ is "0"), the transistor Q5 is turned on (the transistor Q6 is turned off). Thus, an electric current is allowed to flow through the A-phase coil of the pulse motor 48. Thus, a voltage proportional to the current flowing in the A-phase coil is produced in the resistor R11. The produced voltage is applied to the (−) input terminal of the comparator Q9. The comparator Q9 compares the voltage produced in the resistor R11 with the A-phase reference signal REFA. When the input voltage at the (−) input terminal of comparator Q9 is lower than the input voltage (A-phase reference signal REFA) at the (+) input terminal, the output of comparator is 5 V, and the transistor Q1 is turned on. Thus, an electric current is allowed to flow through the A phase coil of the pulse motor 48. When the input voltage at the (−) input terminal of comparator Q9 is greater than that at the (+) input terminal, the output of comparator Q9 is 0 V, and the transistor Q2 is turned off. The voltage across the resistor R1 becomes 0, and the transistor Q1 is turned off. Thus, no current is allowed to flow through the A-phase coil of pulse motor 48. Consequently, the exciting current IA proportional to the voltage of the A-phase reference signal REFA flows to the A-phase of the pulse motor 48.

Figure 8:
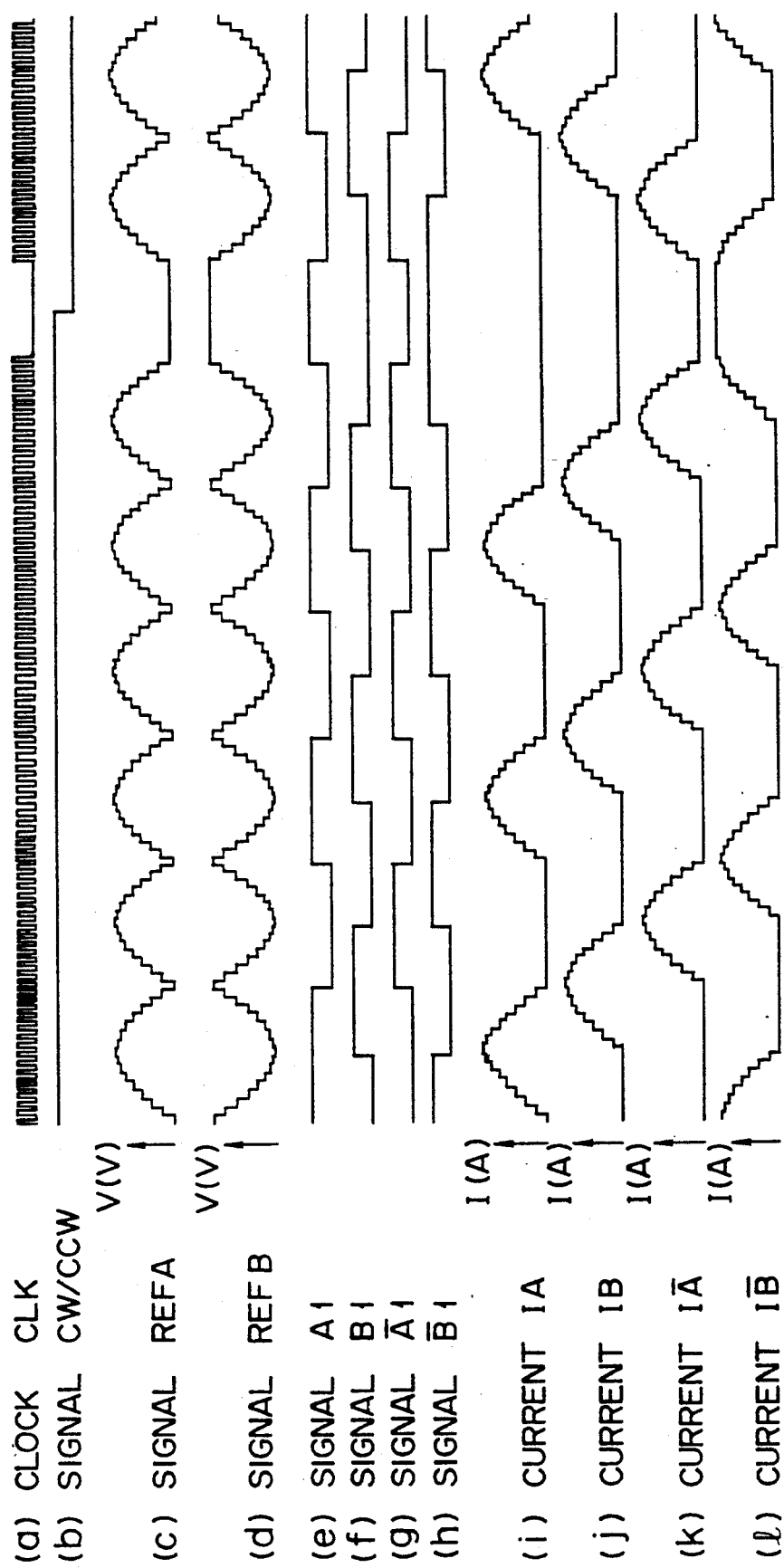
FIG. 8 shows timing charts of the signals flowing in the control system shown in FIG. 4.

Similarly, regarding the excitation signal $\overline{A1}$, the exciting current $\overline{IA}$ proportional to the voltage of the A-phase reference signal REFA is allowed to flow through the $\overline{A}$-phase of the pulse motor 48. Regarding the excitation signal B1, similarly, the exciting current IB proportional to the voltage of B-phase reference signal REFB is allowed to flow through the B-phase of the pulse motor 48. Also, regarding the excitation signal $\overline{B1}$, the exciting current $\overline{IB}$ proportional to the voltage of the B-phase reference signal REFB is let to flow through the $\overline{B}$-phase of the pulse motor 48. The operations of the signal generating circuit 201 and constant-current type driving circuit 202 will now be described with reference to the timing chart of FIG. 8.

When the switching signal CW/CC2W is "1", and the counter 220 in the signal generating circuit 201 starts to count from "00" (hexadecimal), signals corresponding to the contents of the address "00" in the ROMs, 221, 222 and 223 are output from the signal generating circuit 201. The lowermost bit of the output of ROM 223 corresponds to the excitation signal $\overline{B1}$. From the lowermost one, the bits of the output of ROM 223 correspond to the excitation signals $\overline{B1}$, B1, $\overline{A}$ and A1. In response to the clock pulse CLK, the counter 220 counts up, and signals are sequentially output from the signal generating circuit 202. When the switching signal CW/CCW is "1", the excitation signals take the value "1", in the order of A1, B1, $\overline{A1}$ and $\overline{B1}$. The excitation currents having waveforms similar to those of the A-phase reference signal REFA and B-phase reference signal REFB are caused to flow in the order of IA, IB, $\overline{IA}$ and $\overline{IB}$, thereby rotating the pulse motor 48 in the direction CW. In the case where the switching signal CW/CCW is "0", the excitation signals take the value "1" in the order of $\overline{B1}$, $\overline{A1}$, B1 and A1, and the excitation currents having waveforms similar to those of the A-phase reference signal REFA and B-phase reference signal REFB are caused to flow in the order of $\overline{IB}$, $\overline{IA}$, IB and IA, thereby rotating the pulse motor 48 in the direction CCW.

The operation of the pulse motor, in the case where the stepwise exciting currents are supplied to the pulse motor, will now be described.

Figure 9E:
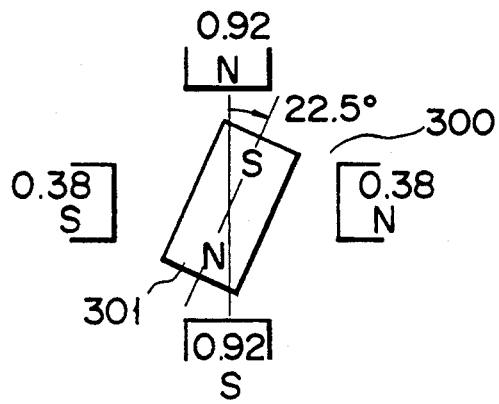
Figure 9F:
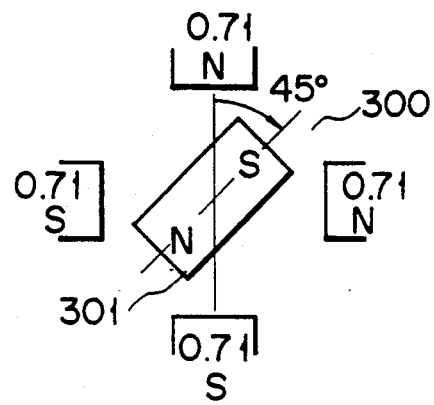
Figure 9G:
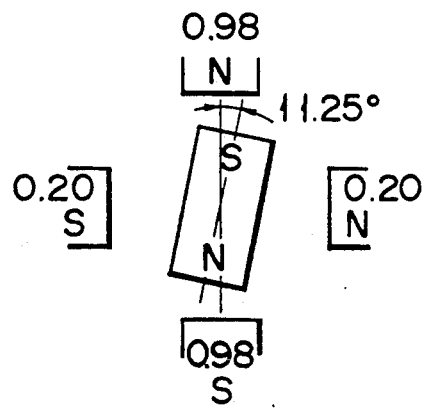

FIGS. 9A to 9G schematically show a PM type pulse motor 30 having a basic step angle of 90°/step, as viewed from a plane perpendicular to the rotational axis of the pulse motor 300. In this case, the pulse motor 300 is rotated in the mode of one-phase excitation. In FIG. 9A, when the exciting current is supplied to the A-phase coil, a rotor 301 is positioned such that the south (S) pole is situated in the above position. In FIG. 9B, the current is supplied to the B-phase winding, and the rotor 301 rotates by 90°. Then, in FIG. 9C, the current flows to the $\overline{A}$-phase winding, and the rotor rotates by 90°. In the state shown in FIG. 9D, the B-phase exciting current is let to flow, and the rotor 301 is further rotated by 90°. In this manner, in the case of the one-phase excitation, the windings are sequentially excited in the order of A-phase, B-phase, A-phase and B-phase, and the rotor 301 is rotated. FIG. 9E shows the state of the pulse motor 300 in the case where the current of a value equal to 0.71 times the maximum value is supplied to the A-phase, winding, and the current of a value equal to 0.71 times the maximum value is supplied to the B-phase winding. In this case, the rotor 301 is stabilized and stopped at a rotation angle of 45°. FIG. 9F shows the state of the pulse motor 300 in the case where the current of a value equal to 0.92 time the maximum value is supplied to the A-phase winding, and the current of a value equal to 0.38 time the maximum value is supplied to the B-phase coil. In this case, the rotor 301 is stabilized and stopped at a rotation angle of 22.5°. Further, FIG. 9G shows the state wherein the current of a value equal to 0.98 times the maximum value is supplied to the A-phase winding, and current of a value equal to 0.20 times the maximum value is supplied to the B-phase winding. In this case, the rotor 301 is stabilized and stopped at a rotation angle of 11.25°. The reason for this is that the torque produced in the pulse motor is equal to a composite value of torques produced in the A-phase winding and B-phase winding in proportion to the currents flowing through the A-phase winding and B-phase winding. FIG. 10 shows pulse vectors in the pulse motor 300. More specifically, FIG. 10 shows torque vectors in the A-phase winding and B-phase winding in the case where the rotor 301 is rotated at 45° and 22.5°, as shown in FIGS. 9E and 9F. As shown in FIG. 10, the torques of the A-phase winding and B-phase winding can be synthesized by changing the ratio therebetween, whereby the rotor 301 is rotated at a given angle.

Figure 11A:
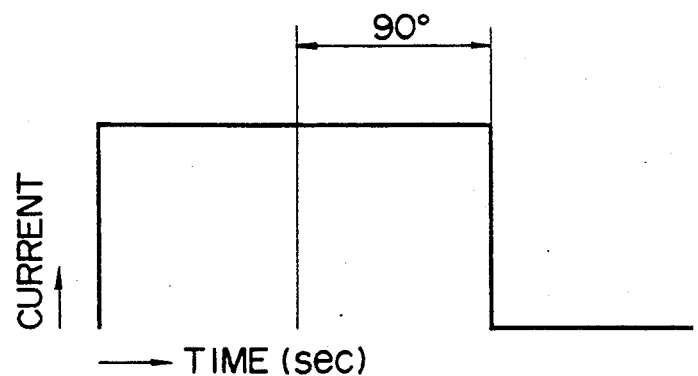
FIGS. 11A to 11D show waveforms of excitation currents supplied to the pulse motor.
Figure 11B:
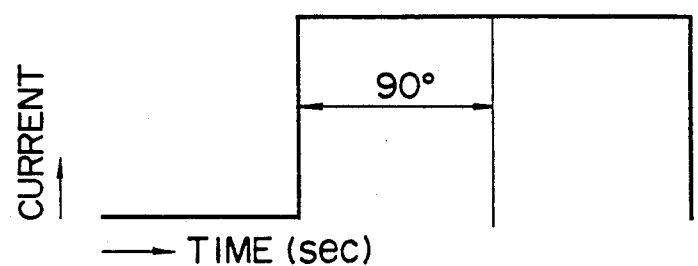
Figure 11C:
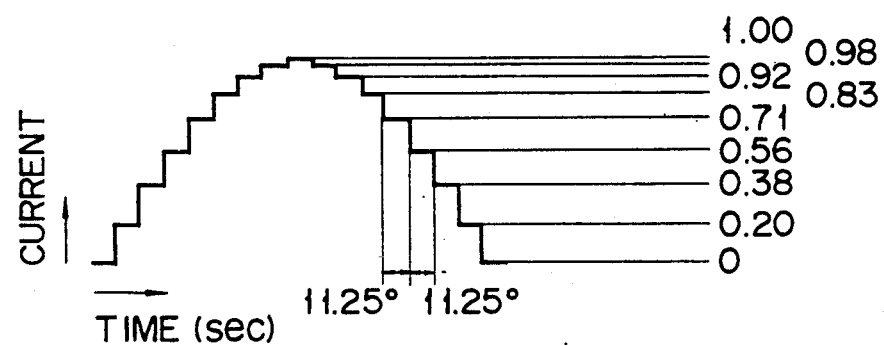
Figure 11D:
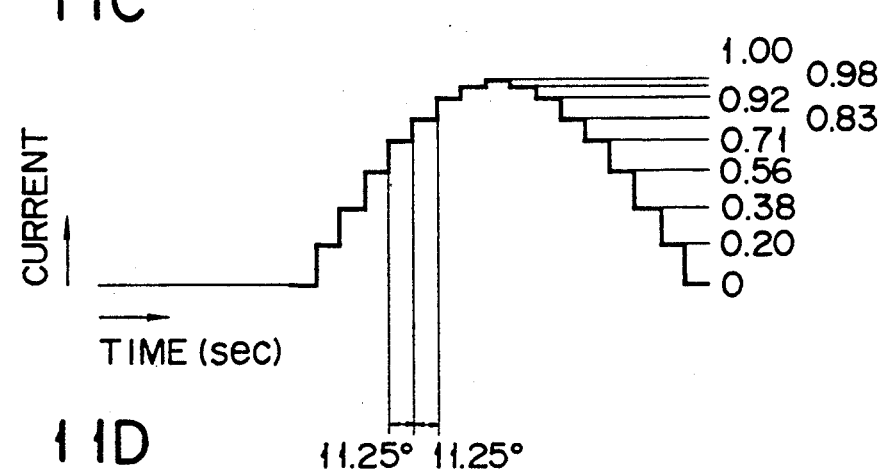

FIGS. 11A to 11D show the exciting current waveforms employed in the present invention. FIGS. 11A and 11B shows the exciting currents IA and IB for rotating a stepping motor with a basic step angle 90° in units of 90°. FIGS. 11C and 11D shows the exciting currents IA and IB for rotating the stepping motor in units of 25° (description relating to the currents $\overline{IA}$ and $\overline{IB}$ may be omitted). The stepwise exciting currents, as shown in FIGS. 11C and 11D, are caused to flow through the A-phase winding, B-phase winding, $\overline{A}$-phase winding and $\overline{B}$-phase winding of the pulse motor 300, so that the rotor 301 rotates in units of 11.25°, which is one eighth of FIGS. 12A and 12B illustrate the rotational operation 90°.

FIGS. 12A and 12B illustrate the rotational operation of the pulse motor 300. In the figures, the abscissa indicates time, and the ordinate indicates angles. FIG. 12A shows the response characteristic of the pulse motor 300 in the case where the motor 300 is rotated in units of a basic step angle. FIG. 12B shows the response characteristic of the pulse motor 300 in the case where the motor 300 is rotated in units of one eighth of the basic step angle. As seen from FIG. 12A, a damping oscillation occurs in the rotor at every rotation step before the rotor is stopped. In FIG. 12B, since the angle of a single rotation step is small, the amplitude of the damping oscillation is smaller. As shown in FIGS. 12A and 12B, the amplitude of the damping oscilation decreases, as the basic step angle is made smaller.

In the image reading apparatus 1, the reading density of the document is variable in accordance with the magnification of the read image in relation to the original image. In other words, when enlarging the image, the document is read with high density. When reducing the image, the document is read with low density. FIGS. 13A to 13E show the relationship between the magnification of the read image in relation to the original image and the scan speed. FIG. 13A shows the case where the image is enlarged by four magnifications, FIG. 13B shows the case where the image is enlarged by two magnifications, FIG. 13C shows the case where the magnification of the image is one, FIG. 13D shows the case where the image is reduced by ½ magnification, and FIG. 13E shows the case where the image is reduced by ¼ magnification. In the case of one magnification of the image shown in FIG. 13C, the image data is read such that, while pixels in one row in the main scan direction of CCD sensor are being read, the image reading unit 7 moves by a distance corresponding to one pixel of the CCD sensor. Also, when the distance of movement is doubled, as shown in FIG. 13D, the amount of read image data is also doubled, but the image area remain unchanged, compared to the case of one magnification. Thus, the read image is reduced to ½. Similarly, when the distance of movement is increased four times, as shown in FIG. 13E, the read image is reduced to ¼. When the distance of movement is reduced to ¼, as shown in FIG. 13A, the read image is enlarged by four magnifications. When the distance of movement is reduced to ½, as shown in FIG. 13B, the read image is doubled in size. In this manner, by changing the distance of movement of the image reading unit 7 per unit time in a range between ¼ times and 4 times, the magnification of the read image can be changed between 4 magnifications and ¼ magnification. In this case, the magnification is expressed by an inverse number of the times of the distance of movement.

As has been described above in detail, the magnification of the image can be changed in the direction of movement, by changing the speed of movement of the image reading unit. If the driving frequency band of the employed pulse motor is changed, for example, in a range of ¼ to 4 times, a motor which can realize the difference in speed of 16 times is required. However, the frequency band of the operation of a pulse motor includes a so-called resonance range. If the pulse motor is operated in the resonance range, such a problem as hunting or resonance occurs. This problem leads to an increase in vibration of the pulse motor, a reverse rotation, and a sudden decrease in torque.

FIG. 14 shows a torque curve (solid line) of a hybrid-type pulse motor. In this figure, the abscissa indicates a rotation speed, and the ordinate indicates a torque. From FIG. 14, it is understood that the torque of the pulse motor falls in a range of 100 to 300 (PPS), where the frequency of the excitation pulse coincides with the natural frequency of the pulse motor. In FIG. 14, a broken line denotes a torque curve obtained in the case where the pulse motor is driven according to the present invention. As shown in FIG. 14, according to the present invention, the torque does not fall, and the motor can be driven over a range of frequencies.

Suppose that the driving frequency of the pulse motor in the case of one magnification is set to 600 (PPS). In this case, if the magnification is changed in a range of ¼ to 4 times, the driving frequency ranges from 150 to 2400 (PPS). While the pulse motor is driven in this manner, an electric current having a stepwise waveform flows through the windings of the pulse motor. If the number of steps in this current is set to 16, 16 times the driving frequencies are required, compared to the case of four magnifications. Thus, the driving frequency band is set in a range of 2400 to 38400 (PPS).

However, a large number of steps are not always necessary. Where the driving speed is low, an exciting current of a small number of steps is sufficient for driving the pulse motor. The reason is that, due to the influence of the inertia force of the motor and load, the inertia force increases as the rotation speed of the motor increases. Thus, even if the current having a large number of steps is not used, the damping oscillation of the rotor of the pulse motor can be reduced. From this, it is understandable that, when the rotation speed of the pulse motor is low, the number of steps of the exciting current flowing through the windings of the pulse motor can be, and when the rotation speed of the pulse motor is high, the number of steps of the current can be reduced.

Figures 15E, 15F:
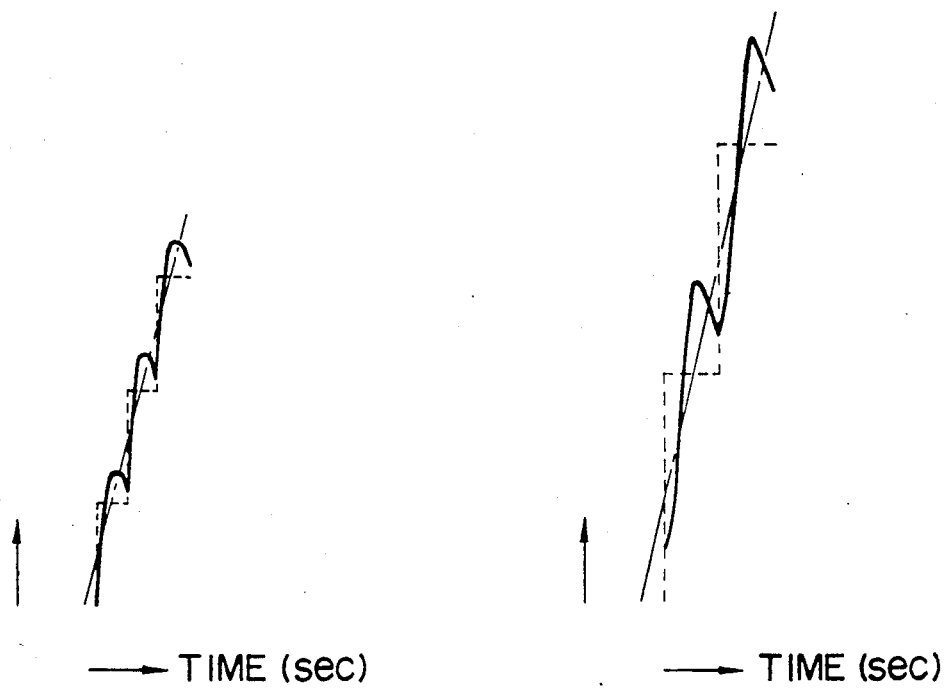
Figures 15G, 15H:
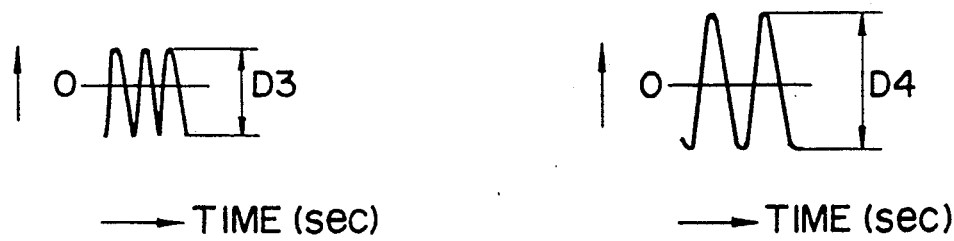

FIGS. 15A to 15H show the relationship between the exciting current flowing through the windings of the pulse motor and the damping oscillation of the rotor of the pulse motor. In FIGS. 15A, 15B, 15E and 15F, the abscissa indicates time and the ordinate indicates the rotation angle of the rotor of the pulse motor. In these figures, the actual rotation of the rotor of the pulse motor is indicated by solid lines, the ideal rotation of the rotor of the pulse motor is indicated by broken lines, and the ideal rotation angle is indicated by dot-and-dash line. FIG. 15C shows an angle displacement representative of a difference between the rotation angle of the rotor of the pulse motor in the state shown in FIG. 15A, and the ideal rotation angle. Similarly, FIG. 15D shows an angle displacement in the state shown in FIG. 15B, and FIG. 15G shows an angle displacement in the state shown in FIG. 15E. FIG. 15B illustrates the relationship between the time and rotation angle in the case where the rotation speed is increased, compared to the case shown in FIG. 15A. In this way, even when the motor is rotated by application of the exciting current having the same number of steps, the damping oscillation is decreased if the rotation speed is increased. Thus, the difference D2 between the maximum value and the minimum value, which is shown in FIG. 15D becomes smaller than the difference D1 between the maximum value and the minimum value, which is shown in FIG. 15C. Similarly, FIG. 15E shows the relationship between the time and rotation angle in the case where the rotation speed is increased, compared to the case shown in FIG. 15B. The difference D3 between the maximum value and the minimum value, which is shown in FIG. 15G, becomes smaller than the difference D between the maximum value and the minimum value, which is shown in FIG. 15D.

FIG. 15F shows the relationship between the time and rotation angle in the case where the number of steps is decreased, compared to the case shown in FIG. 15E. Also, in the case shown in FIG. 15F, the difference D4 between the maximum value and the minimum value, which is shown in FIG. 15H, is greater than the difference D3 between the maximum value and the minimum value, which is shown in FIG. 15G.

In FIG. 15C, after the damping oscillation is repeated about three times, the rotation angle shifts to the next angle. In FIG. 15G, in the midst of the first damping oscillation, the rotation angle shifts to the next angle. Thus, the oscillation component, and, accordingly, the angle displacement, become smaller in the case shown in FIG. 15G, than in the case shown in FIG. 15C. As described above, in the case where the excitation signal has the same number of steps, the higher the rotation speed, the smaller the oscillation and the smaller the rotation fluctuation. In other words, when the driving frequency is low, even if the number of steps is increased, the stable rotation of the pulse motor is attained. Also, when the driving frequency is high, even if the number of steps is decreased, the stable rotation of the pulse motor is attained. For example, suppose that two steps are provided in a range of ¼ to ½ magnification, four steps are provided in a range of ½ to 1/1 magnification, 8 steps are provided in a range of 1/1 to 2/1 magnifications, and 16 steps are provided in a range of 2/1 to 4 magnifications, and that the driving frequency of one magnification is 600 (PPS). In this case, the driving frequency band is 2400 to 4000 (PPS). FIGS. 16A to 16D show exciting currents of these steps, which are caused to flow the windings of the pulse motor. FIG. 16A shows a two-step current waveform, FIG. 16B shows a four-step current waveform, FIG. 16C shows an 8-step current waveform, and FIG. 16D shows a 16-step current waveform.

Another embodiment of the present invention will now be described. In this embodiment, data units shown in FIGS. 17A, 17B and 17C are stored in the ROMs 221, 222 and 223 shown in FIG. 5. FIG. 17A shows the data units stored in ROM 221, FIG. 17B shows the data units stored in ROM 222, and FIG. 17C shows the data units stored in ROM 223. These data units are stored in an area of addresses "000" (hexadecimal number) to "OFF" (hexadecimal number), an area of addresses "100" (hexadecimal number) to "1FF" (hexadecimal number), an area of addresses "200" (hexadecimal number) to "2FF" (hexadecimal number), and an area of addresses "300" (hexadecimal number) to "3FF" (hexadecimal number), so as to change the maximum values of the exciting currents caused to flow through the windings of the pulse motor.

The torque of the pulse motor decreases in a high-speed region, and the pulse motor may be stopped in this region. If a pulse motor having a sufficient torque in a high-speed region is used, the torque thereof would be too high in a low-speed region. If the increase in torque in the low-speed region leads to a higher damping oscillation occurring in the case where the current angle is shifted to the next angle, and resonance occurs. By decreasing the exciting currents and lowering the value of the torque to a minimum necessary value, the damping oscillation is decreased.

Figure 18:
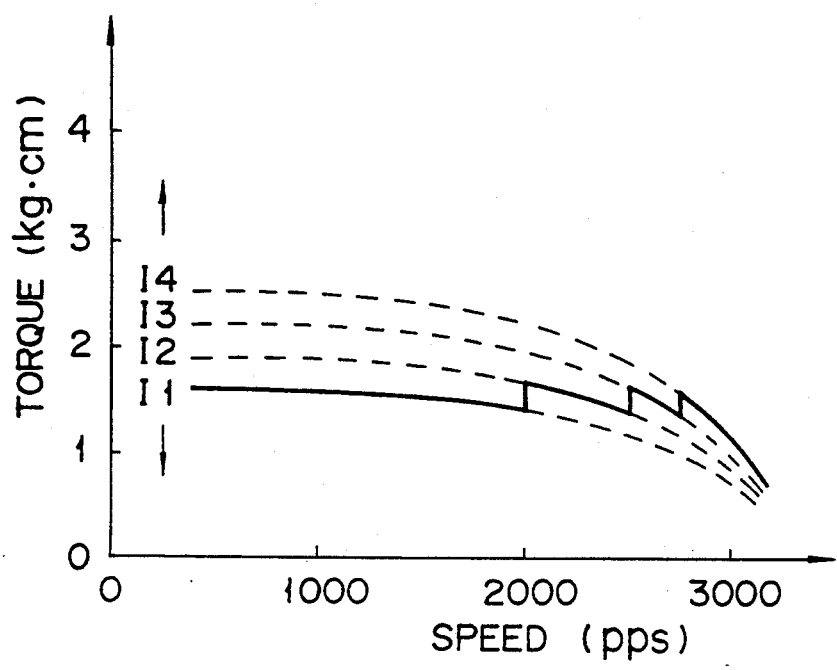
FIG. 18 shows the relationship between the values of the exciting current and the torque of a pulse motor according to another embodiment of the invention.

FIG. 18 shows a torque curve of the pulse motor, which is obtained by using a driving circuit wherein the maximum value of the exciting current is varied in four stages with use of a data structure similar to that shown in FIG. 17A, 17B or 17C. The abscissa indicates the speed, and the ordinate indicates the torque. The exciting current value increases in the order of I1, I2, I3 and I4, and the produced torque also increases in this order. In this embodiment, in a range of 200 to 2000 (PPS), the current value I1 is used. In a range 2000 to 2500 (PPS), the current value I2 is used. In a range of 2500 to 2700 (PPS), the current value I3 is used. In a range of 2700 to 3200 (PPS), the current value I4 is used. Thus, the pulse motor can be driven with a sufficient torque in the high-speed range, and with a low damping oscillation in a low-speed range.

Figure 19:
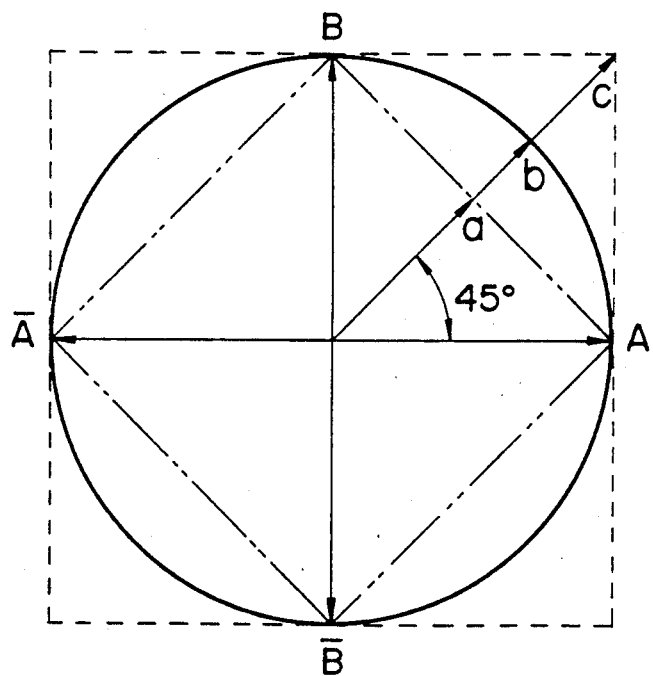
FIG. 19 shows a variation in torque, as seen from the viewpoint of a torque vector figure of the pulse motor.

FIG. 19 shows a torque vector of the pulse motor driven in the image reading apparatus of the present invention. In this figure, a two-dot-and-dash line denotes a torque obtained when a triangular-wave excitation angle is caused to flow through the windings of the pulse motor. A solid line denotes a torque obtained when a sine-wave exciting current is caused to flow through the pulse motor, and a broken line denotes a torque obtained when a trapezoidal-wave exciting current is supplied to the pulse motor.

In FIG. 19, the A-phase winding, B-phase winding, $\overline{A}$-phase winding and $\overline{B}$-phase winding are arranged at a regular interval of an electrical angle 90°. The basic step angle of the pulse motor corresponds to an electrical angle 90°. For example, the pulse motor rotates by 1.8° in one step. Supposing that the electrical angle is 0 and the rotational angle is 0 in the state of the motor wherein only the A-phase winding is excited, if the motor is rotated to the left by an electrical angle 45°, the rotational angle is 0.9°.

At this time, the composite torque of the pulse motor is obtained by synthesizing the A-phase torque vector and the B-phase torque vector. The torque of the motor in the rotational direction is proportional to the composite torque. As the composite torque increases, the torque in the rotational direction becomes greater. Thus, as shown in FIG. 19, the torque in the rotational direction increases as the exciting current waveform varies in the order of the triangular wave, sine wave and trapezoidal wave. In addition, in the pulse motor, when the value of the torque in the rotational direction increases, the damping oscillation of the pulse motor increases. In this invention, the trapezoidal wave is used in the high-speed region in which a large torque is required. The triangular wave is used in the low-speed region in which oscillation must be reduced, and the sine wave is used in the intermediate-speed region. Consequently, over the range of the low speed to the high speed, a necessary and sufficient torque in the rotational direction can be obtained, and stable rotation with less oscillation can be obtained.

Figure 20:
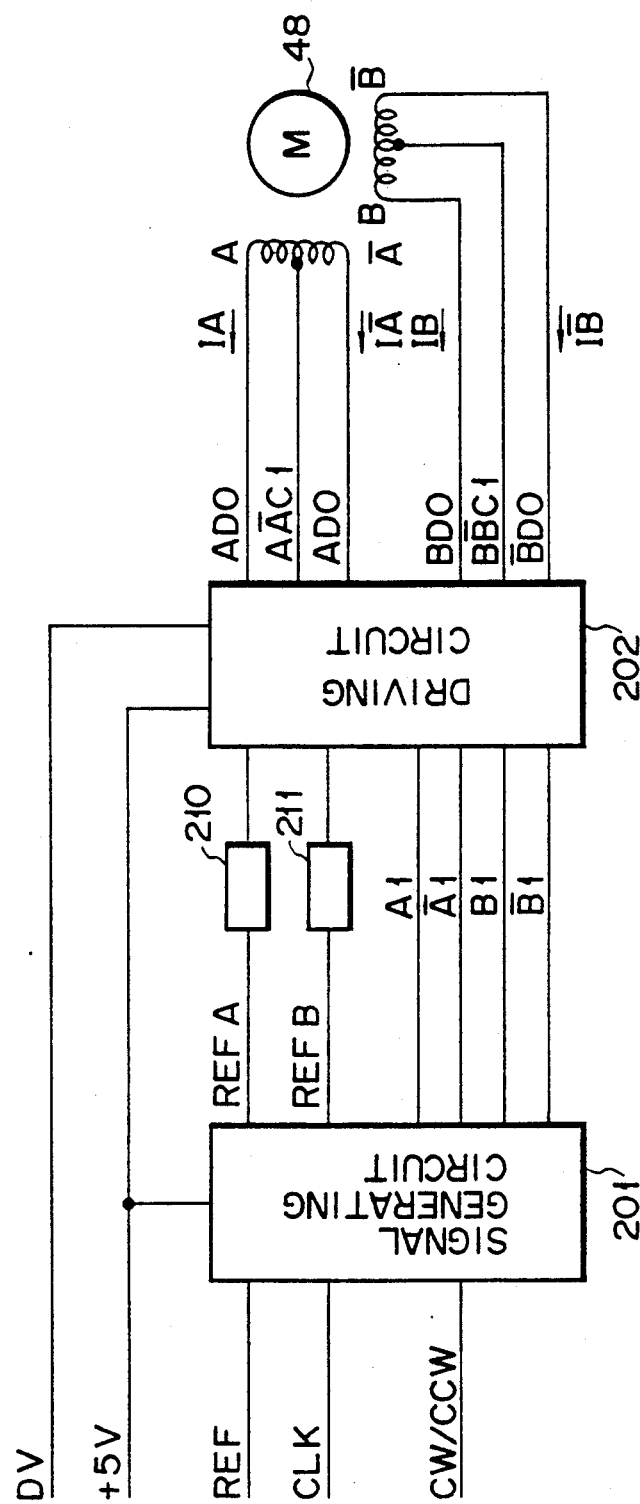
FIG. 20 shows a block diagram showing an image reading apparatus according to still another embodiment of the present invention.

FIG. 20 shows an example of a driving circuit in which low-pass filters 210 and 211 for filtering the A-phase reference signal REFA and B-phase reference signal REFB generated from the signal generating circuit 201 is arranged between the signal generating circuit 201 and the constant-current type driving circuit 202. By using the low-pass filters 210 and 211, high-frequency components are eliminated from stepwise waveforms of the A-phase reference signal REFA and B-phase reference signal REFB, and these reference signals are smoothed. Consequently, the exciting currents flowing through the pulse motor 48 is smoothed, and the pulse motor is rotated with less oscillation.

The filters 210 and 211 will now be described in greater detail.

Figure 21A:
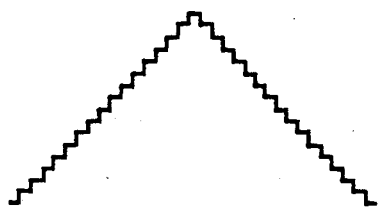
FIGS. 21A to 21F show waveforms of various excitation currents.
Figure 21B:
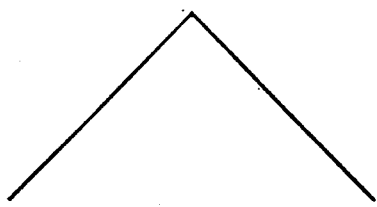
Figure 21C:
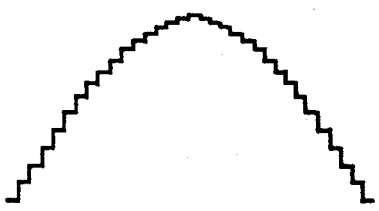
Figure 21D:
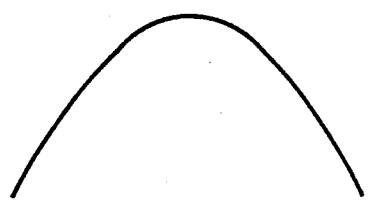
Figure 21E:
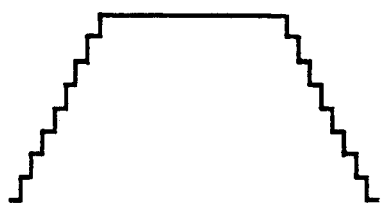
Figure 21F:
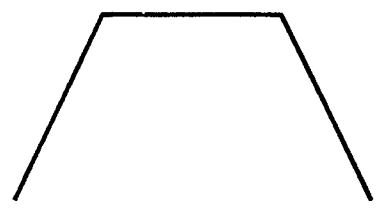

When the stepwise triangular-wave A-phase and B-phase reference signals REFA and REFB, as shown in FIG. 21A, are supplied from the signal generating circuit 201 to the filters 210 and 211, the filters 210 and 211 output smoothed triangular-wave reference signals, as shown in FIG. 21C. Similarly, when the sine-wave reference signals, as shown in FIG. 21C are input to the filters 210 and 211, the filters 210 and 211 output smoothed sine-wave reference signals, as shown in FIG. 21D. FIG. 21E shows a trapezoidal-wave reference signal before it is smoothed, and FIG. 21F shows the trapezoidal-wave reference signal after it has been smoothed. With the use of the A-phase and B-phase reference signals having the smoothed triangular wave, sine wave and trapezoidal wave, the excitation currents which have been more smoothed than in the first embodiment can be obtained, and the pulse motor can be rotated with less oscillation.

As has been described above, according to the present invention, the oscillation of the apparatus, which occurs when the pulse motor is rotated, can be reduced. Also, the oscillation of the reading unit for reading the document, which is moved by the pulse motor, can be reduced while the reading unit is moved. Therefore, an excellent image of a document, which is free from blurring, can be read by the reading unit.

Further, according to the present invention, the data units for generating the control signal are stored in the ROMs. Thus, the data units can be read out simultaneously with the generation of addresses, and the synchronism between different signals can easily be established.

Furthermore, the pulse motor is used to move the reading unit 7 or to drive the rollers 8 to 15. Thus, even when the reading unit 7 is moved while the document is placed on the exposure glass 5, the reading unit 7 can be smoothly moved. As a result, stable image reading is ensured. In addition, when the document is transferred by the rollers 8 to 15 and the image of the document is read by the fixed reading unit, the document is smoothly moved and stable image reading is ensured.

What is claimed is:

1. An image reading apparatus comprising:
   reading means for reading an image of a document at a predetermined reading density;

transfer means, for moving at least one of the reading means and the document at a speed corresponding to the reading density, said transfer means having a pulse motor; and motor driving means for outputting an exciting current having a plurality of current waveforms each corresponding to one step of rotation of said pulse motor, each of said current waveforms being a stepped waveform including a plurality of steps, and said motor driving means including means for changing the number of the steps of each of the current waveforms of the exciting current in accordance with the reading density.

2. The image reading apparatus according to claim 1, wherein said motor driving means comprises means for generating a reference excitation signal having a plurality of waveforms each corresponding to one step of rotation and each being a stepped waveform having a plurality of steps, waveform-changing means for changing the number of the steps of the stepped waveform of the reference excitation signal in accordance with the reading density, and outputting an excitation signal, and means for converting the excitation signal to the exciting current.

3. The image reading apparatus according to claim 2, wherein said waveform-changing means comprises means for setting the stepped waveform of the reference excitation signal to a stepped waveform having an amplitude corresponding to the reading density.

4. The image reading apparatus according to claim 2, wherein said waveform-changing means comprises means for setting the stepped waveform of the reference excitation signal to a stepped waveform having a magnitude corresponding to the reading density.

5. The image reading apparatus according to claim 4, wherein said waveform-changing means comprises means for setting the stepped waveform of the reference excitation signal selectively to a triangular wave, a sine wave or a trapezoidal wave.

6. The image reading apparatus according to claim 1, wherein said motor driving means comprises means for setting the stepped waveform of the exciting current to a stepped waveform having an amplitude corresponding to the reading density.

7. The image reading apparatus according to claim 1, wherein said motor driving means comprises means for setting the stepped waveform of the exciting current to a stepped waveform having a magnitude corresponding to the reading density.

8. The image reading apparatus according to claim 7, wherein said motor driving means comprises means for setting the stepped waveform of the exciting current selectively to a stepped triangular wave, a stepped sine wave or a stepped trapezoidal wave.

9. The image reading apparatus according to claim 1, further comprising memory means for storing a plurality of waveform data units corresponding to the reading density, and means for setting the stepped waveform of the exciting current on the basis of the waveform data units read out from the memory means.

10. An image reading apparatus comprising:

reading means for reading an image of a document at a predetermined reading density;

transfer means, for moving at least one of the reading means and the document at a speed corresponding to the reading density, said transfer means having a pulse motor;

reference excitation signal generating means for generating a reference excitation signal having a plurality of waveforms each corresponding to one step of rotation and each being a stepped waveform having a plurality of steps, said reference excitation signal generating means including means for changing the number of the steps of the stepped waveform of the reference excitation signal in accordance with the reading density;

excitation signal generating means for converting the reference excitation signal into an excitation signal having a stepped waveform corresponding to the stepped waveform of the reference excitation signal; and means for driving the pulse motor in accordance with the excitation signal from the excitation signal generating means.

11. The image reading apparatus according to claim 10, wherein said excitation signal generating means comprises memory means for storing a plurality of waveform data units corresponding to different numbers of steps, each of which corresponds to the recording density, and means for changing the number of the steps of the waveform of the reference excitation signal in accordance with the waveform data units.

12. The image reading apparatus according to claim 10, wherein said pulse motor has a plurality of phase windings, and said reference excitation signal generating means synchronously generates a plurality of reference excitation signals corresponding to said phase windings, respectively.

13. The image reading apparatus according to claim 12, wherein said reference excitation signal generating means comprises memory means for storing a plurality of waveform data units in correspondence with the phase windings, the waveform data units each forming a stepwise waveform having a plurality of steps, the number of which corresponds to the recording density, and means for simultaneously reading out the waveform data units corresponding to the phase windings from the memory means, and changing, in accordance with the read-out waveform data units, the number of the steps the stepwise waveform of the corresponding reference excitation signal.

14. The image reading apparatus according to claim 10, wherein said excitation signal generating means includes filter means for smoothing the excitation signal.

* * * * *